United States Patent
Zhang et al.

(10) Patent No.: US 11,458,696 B2
(45) Date of Patent: *Oct. 4, 2022

(54) SYSTEM FOR PRODUCING A FULLY IMPREGNATED THERMOPLASTIC PREPREG

(71) Applicant: JOHNS MANVILLE, Denver, CO (US)

(72) Inventors: Mingfu Zhang, Englewood, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/843,312

(22) Filed: Apr. 8, 2020

(65) Prior Publication Data
US 2020/0230898 A1 Jul. 23, 2020

Related U.S. Application Data

(60) Division of application No. 16/172,153, filed on Oct. 26, 2018, now Pat. No. 10,717,245, which is a
(Continued)

(51) Int. Cl.
*B29C 70/50* (2006.01)
*B05C 9/12* (2006.01)
(Continued)

(52) U.S. Cl.
CPC .............. *B29C 70/504* (2013.01); *B05C 9/10* (2013.01); *B05C 9/12* (2013.01); *B05C 9/14* (2013.01);
(Continued)

(58) Field of Classification Search
None
See application file for complete search history.

(56) References Cited

U.S. PATENT DOCUMENTS

| | | |
|---|---|---|
| 3,086,962 A | 4/1963 | Mottus et al. |
| 3,323,945 A | 6/1967 | Hechelhammer et al. |

(Continued)

FOREIGN PATENT DOCUMENTS

| | | |
|---|---|---|
| CA | 1 221 216 A1 | 5/1987 |
| CN | 103570961 A | 2/2014 |

(Continued)

OTHER PUBLICATIONS

Van Rijswijk, K., et al., Reactive processing of anionic polyamide-6 for application in fiber composites: A Comparitive study with melt processed polyamide and nanocomposites, Polymer Testing, vol. 25 (2006), pp. 873-887.

(Continued)

*Primary Examiner* — Binu Thomas
(74) *Attorney, Agent, or Firm* — Robert D. Touslee

(57) ABSTRACT

A thermoplastic prepreg includes a mat, web, or fabric of fibers and hollow glass microspheres that are positioned atop the mat, web, or fabric of fibers or dispersed therein. The thermoplastic prepreg also includes a thermoplastic polymer that is fully impregnated through the mat, web, or fabric of fibers and the hollow glass microspheres so that the thermoplastic prepreg has a void content of less than 3% by volume of the thermoplastic prepreg. The thermoplastic material is polymerized monomers and oligomers in which greater than 90% by weight of the monomers or oligomers react to form the thermoplastic material.

20 Claims, 15 Drawing Sheets

Related U.S. Application Data continuation-in-part of application No. 15/944,249, filed on Apr. 3, 2018, now Pat. No. 11,198,259.

(51) Int. Cl.

| | |
|---|---|
| *B05C 9/14* | (2006.01) |
| *B05C 11/02* | (2006.01) |
| *B29B 15/12* | (2006.01) |
| *B32B 5/32* | (2006.01) |
| *B05D 1/40* | (2006.01) |
| *B05D 3/02* | (2006.01) |
| *B29B 11/12* | (2006.01) |
| *B29B 11/16* | (2006.01) |
| *B29B 13/02* | (2006.01) |
| *B29B 13/06* | (2006.01) |
| *B29B 15/14* | (2006.01) |
| *B29C 70/06* | (2006.01) |
| *C08J 5/04* | (2006.01) |
| *C08K 7/04* | (2006.01) |
| *D06M 15/71* | (2006.01) |
| *D06M 15/705* | (2006.01) |
| *D06M 15/61* | (2006.01) |
| *D06M 15/51* | (2006.01) |
| *B05C 9/10* | (2006.01) |
| *B29C 48/285* | (2019.01) |
| *B29K 33/00* | (2006.01) |
| *B29K 105/08* | (2006.01) |
| *B29K 105/00* | (2006.01) |
| *B29L 7/00* | (2006.01) |
| *B29L 9/00* | (2006.01) |

(52) U.S. Cl.
CPC .............. *B05C 11/021* (2013.01); *B05D 1/40* (2013.01); *B05D 3/0227* (2013.01); *B05D 3/0272* (2013.01); *B29B 11/12* (2013.01); *B29B 11/16* (2013.01); *B29B 13/02* (2013.01); *B29B 13/06* (2013.01); *B29B 15/122* (2013.01); *B29B 15/14* (2013.01); *B29C 48/285* (2019.02); *B29C 70/06* (2013.01); *C08J 5/041* (2013.01); *C08J 5/042* (2013.01); *C08J 5/043* (2013.01); *C08J 5/0405* (2021.05); *C08K 7/04* (2013.01); *D06M 15/51* (2013.01); *D06M 15/61* (2013.01); *D06M 15/705* (2013.01); *D06M 15/71* (2013.01); *B29K 2033/12* (2013.01); *B29K 2105/089* (2013.01); *B29K 2105/256* (2013.01); *B29L 2007/002* (2013.01); *B29L 2009/00* (2013.01); *B32B 5/32* (2013.01); *B32B 2262/02* (2013.01); *B32B 2262/101* (2013.01); *B32B 2262/103* (2013.01); *B32B 2262/106* (2013.01); *B32B 2305/076* (2013.01)

(56) References Cited

U.S. PATENT DOCUMENTS

| | | |
|---|---|---|
| 3,347,818 A | 10/1967 | Lau et al. |
| 3,386,943 A | 6/1968 | Hedrick et al. |
| 3,451,963 A | 6/1969 | Tierney et al. |
| 3,833,534 A | 9/1974 | Tierney et al. |
| 3,849,154 A | 11/1974 | Michael et al. |
| 3,888,832 A | 6/1975 | Biensan et al. |
| 4,271,229 A | 6/1981 | Temple |
| 4,339,490 A | 7/1982 | Yoshioka et al. |
| 4,495,017 A | 1/1985 | Abe et al. |
| 4,496,415 A | 1/1985 | Sprengling |
| 4,528,223 A | 7/1985 | Kumazawa et al. |
| 4,804,427 A | 2/1989 | Paul et al. |
| 5,116,216 A | 5/1992 | Cochran et al. |
| 5,205,898 A | 4/1993 | Wilson et al. |
| 5,269,863 A | 12/1993 | Middelman |
| 5,294,461 A | 3/1994 | Ishida |
| 5,374,385 A | 12/1994 | Binse et al. |
| 5,407,616 A | 4/1995 | Dube |
| 5,424,388 A | 6/1995 | Chen et al. |
| 5,492,755 A | 2/1996 | Binse et al. |
| 5,665,295 A * | 9/1997 | Takamoto ............ B29B 15/122 264/172.19 |
| 5,679,719 A | 10/1997 | Klemarczyk et al. |
| 5,780,099 A | 7/1998 | Gilligan |
| 5,837,181 A | 11/1998 | Leimbacher et al. |
| 5,895,808 A | 4/1999 | Schmid et al. |
| 5,980,796 A | 11/1999 | Nussdorfer et al. |
| 6,283,166 B1 | 9/2001 | Miyasato et al. |
| 6,369,157 B1 | 4/2002 | Winckler et al. |
| 6,436,548 B1 | 8/2002 | Phelps |
| 6,713,601 B2 | 3/2004 | Phelps |
| 7,151,143 B2 | 12/2006 | Wang et al. |
| 7,790,284 B2 | 9/2010 | Davies |
| 7,824,770 B2 | 11/2010 | Honma et al. |
| 8,123,887 B2 | 2/2012 | Green |
| 8,293,322 B2 | 10/2012 | Burghardt et al. |
| 8,394,731 B2 | 3/2013 | Sato et al. |
| 9,186,852 B2 | 11/2015 | Zhang et al. |
| 9,815,954 B2 | 11/2017 | Zhang et al. |
| 9,962,888 B2 | 5/2018 | Zhang et al. |
| 9,993,945 B2 | 6/2018 | Zhang et al. |
| 10,105,871 B2 | 10/2018 | Zhang et al. |
| 2001/0032696 A1* | 10/2001 | Debalme ................ B29B 15/12 156/173 |
| 2004/0188883 A1 | 9/2004 | Barron et al. |
| 2005/0214465 A1 | 9/2005 | Maskus et al. |
| 2008/0078150 A1 | 4/2008 | Kariya |
| 2009/0233508 A1 | 9/2009 | Kubota et al. |
| 2009/0246468 A1 | 10/2009 | Schubiger |
| 2010/0040857 A1 | 2/2010 | Schubiger |
| 2010/0215920 A1 | 8/2010 | Orange et al. |
| 2010/0280239 A1 | 11/2010 | Shooshtar et al. |
| 2010/0305269 A1 | 12/2010 | Gleich et al. |
| 2011/0045275 A1 | 2/2011 | Tadepalli et al. |
| 2012/0107509 A1 | 5/2012 | Scherzer et al. |
| 2013/0221555 A1 | 8/2013 | Radtke et al. |
| 2013/0295806 A1* | 11/2013 | Imai ..................... B29B 15/12 428/389 |
| 2014/0093736 A1 | 4/2014 | Takada et al. |
| 2014/0165585 A1 | 6/2014 | Burd |
| 2015/0145165 A1 | 5/2015 | Zhang et al. |
| 2017/0008239 A1* | 1/2017 | Zhang .................. B05C 5/0245 |
| 2017/0066158 A1 | 3/2017 | Zhang et al. |

FOREIGN PATENT DOCUMENTS

| | | |
|---|---|---|
| DE | 2 249 189 A1 | 4/1974 |
| DE | 10 2007 031 467 A1 | 1/2009 |
| DE | 10 2011 055 263 A1 | 5/2013 |
| DE | 10 2010 040 027 B4 | 7/2013 |
| EP | 0 114 971 B1 | 3/1988 |
| EP | 0 134 992 B1 | 9/1988 |
| EP | 0 589 640 A1 | 3/1994 |
| EP | 0 655 476 A1 | 5/1995 |
| EP | 0 752 306 A1 | 1/1997 |
| EP | 2 774 944 A1 | 9/2014 |
| JP | 59-199863 A | 11/1984 |
| JP | S60226510 A | 11/1985 |
| WO | 2011/073200 A1 | 6/2011 |
| WO | 2011/006947 A1 | 9/2012 |
| WO | 2012/116947 A1 | 9/2012 |
| WO | 2013/050074 A1 | 4/2013 |
| WO | 2013/056845 A2 | 4/2013 |

OTHER PUBLICATIONS

Tripathy, A.R., et al., Effects of Catalyst and Polymerization Temperature on the In-Situ Polymerization of Cyclic Poly (Butylene

(56) References Cited

OTHER PUBLICATIONS

Terephthalate) Oligomers for Composite Applications, Macromolecules, vol. 38 (2005), pp. 709-715.

\* cited by examiner

SYSTEM FOR PRODUCING A FULLY IMPREGNATED THERMOPLASTIC PREPREG

CROSS-REFERENCE TO RELATED APPLICATIONS

This application is a division of U.S. patent application Ser. No. 16/172,153 filed Oct. 26, 2018, which is a continuation-in-part of U.S. patent application Ser. No. 15/944,249 filed Apr. 3, 2018, entitled "SYSTEM FOR PRODUCING A FULLY IMPREGNATED THERMOPLASTIC PREPREG," the entire disclosures of which are hereby incorporated by reference, for all purposes, as if fully set forth herein. This application is also related to U.S. patent application Ser. No. 14/088,034 filed Nov. 22, 2013 and titled "FIBER-CONTAINING PREPREGS AND METHODS AND SYSTEMS OF MAKING," the entire disclosure of which is hereby incorporated by reference, for all purposes, as if fully set forth herein.

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of fiber-reinforced polymeric composites, thermoplastics are increasingly being used in place of thermosets as the matrix resin due to better durability, recyclability, thermoformability, improved throughput, lower material cost, and lower manufacturing cost.

Many continuous fiber reinforced thermoplastic composites are produced from impregnated tapes. These impregnated tapes may be unidirectional fiber tapes that are impregnated with a thermoplastic resin. These can be layered and thermoformed to produce a wide variety of composites of the desired shape and strength. There are significant challenges associated with producing impregnated tapes at low cost and high quality. Traditionally thermoplastic resins are melted and applied to fibers, but molten thermoplastic resins have very high viscosity and, when combined with the high fiber content that is desired, results in incomplete resin impregnation and/or low throughput. What is desired is a continuous manufacturing process with high throughput that produces fully impregnated thermoplastic prepregs without defects and good coupling between the fibers and the matrix resin. For the conventional partially impregnated thermoplastic prepregs, high pressure is needed in the consolidation step to promote additional impregnation, which introduces excessive flow of the resin matrix and causes detrimental changes in fiber orientation in the finished parts. The fully impregnated thermoplastic prepregs of the instant invention are advantageous in achieving the desired properties in final composite parts, as no additional impregnation is needed in the consolidation step.

BRIEF SUMMARY

The embodiments described herein provide fully impregnated thermoplastic prepreg products, and specifically systems and methods for making the same. According to one aspect, a system for manufacturing a thermoplastic prepreg includes a double belt mechanism that includes an upper belt and a lower belt. The upper belt is positioned atop the lower belt to compress a fiber mat, web, or fabric and a lightweight filler material that is passed through the double belt mechanism and the lower belt has a longitudinal length that is substantially longer than the upper belt. Examples of the lightweight filler material include hollow glass microspheres. The system also includes a drying mechanism that is configured to remove residual moisture from the fiber mat, web, or fabric and the lightweight filler material as the fiber mat, web, or fabric and the lightweight filler material are moved past the drying mechanism. The system further includes an application mechanism that is positioned atop the lower belt and that is configured to apply the light weight filler material to the fiber mat, web, or fabric as the fiber mat, web, or fabric is moved past the application mechanism. The system additionally includes a resin application die that is positioned atop the lower belt and that is configured to apply monomers or oligomers to the fiber mat, web, or fabric as the fiber mat, web, or fabric is moved past the resin application die. The monomers or oligomers are polymerizable to form a thermoplastic polymer. The system additionally includes a curing oven that is configured to effect polymerization of the monomers or oligomers and thereby form the thermoplastic polymer as the fiber mat, web, or fabric and lightweight filler material are moved through the curing oven. The double belt mechanism compresses the fiber mat, web, or fabric, the lightweight filler material, and the applied monomers or oligomers as these materials are passed through the curing oven such that the monomers or oligomers fully saturate the fiber mat, web, or fabric and the lightweight filler material. A full impregnation of the fiber mat, web, or fabric and the lightweight filler material with the thermoplastic polymer is thereby achieved upon polymerization of the monomers or oligomers.

As described herein, full impregnation of the fiber mat, web, or fabric and the lightweight filler material with the thermoplastic polymer means that the fiber mat, web, or fabric and the lightweight filler material are saturated with the thermoplastic polymer so that the fully impregnated thermoplastic prepreg has a void content of less than 3% in volume based on the total volume of the thermoplastic prepreg. As described herein, the lightweight filler material may be hollow glass microspheres. In such instances, "hollow" interior volume of the hollow glass microspheres is not included in the void content described above—i.e., void content of less than 3%. In addition, the hollow interior of the hollow glass microspheres is not "filled" with the thermoplastic polymer as a person of skill would readily understand.

According to another aspect, a method of forming a thermoplastic prepreg includes moving a fiber mat, web, or fabric atop a lower belt of a double belt press mechanism and drying the fiber mat, web, or fabric via a drying mechanism to remove residual moisture from the fiber mat, web, or fabric. The method also includes applying a lightweight filler material to the fiber mat, web, or fabric via an application mechanism that is positioned atop the lower belt as the fiber mat, web, or fabric is moved past the application mechanism and applying monomers or oligomers to the fiber mat, web, or fabric via a resin application die that is positioned atop the lower belt. The method further includes passing the fiber mat, web, or fabric, the lightweight filler material, and the applied monomers or oligomers between the lower belt and an upper belt of the double belt press mechanism to press the monomers or oligomers through the fiber mat, web, or fabric and the lightweight filler material and thereby fully saturate the fiber mat, web, or fabric and lightweight filler material with the monomers or oligomers. The method additionally includes passing the fully saturated fiber mat, web, or fabric and lightweight filler material through a curing oven to polymerize the monomers or oligomers and thereby form a thermoplastic polymer as the fiber mat, web, or fabric and lightweight filler material are moved through the curing oven. Upon polymerization of the monomers or oligomers, the fiber mat, web, or fabric and lightweight filler material are fully impregnated with the thermoplastic polymer.

According to another aspect, a thermoplastic prepreg includes a mat or web of fibers and hollow glass microspheres that are positioned atop the mat or web of fibers or dispersed therein. The thermoplastic prepreg also includes a thermoplastic polymer that is fully impregnated through the mat or web of fibers and the hollow glass microspheres so that the thermoplastic prepreg is substantially free of gaps or voids, which means that the fully impregnated thermoplastic prepreg has a gap or void content of less than 3% in volume based on the total volume of the thermoplastic prepreg. The thermoplastic material is polymerized monomers and oligomers in which greater than 90% by weight of the monomers or oligomers react to form the thermoplastic material.

BRIEF DESCRIPTION OF THE DRAWINGS

The present technology is described in conjunction with the appended figures.

Figure 1A:
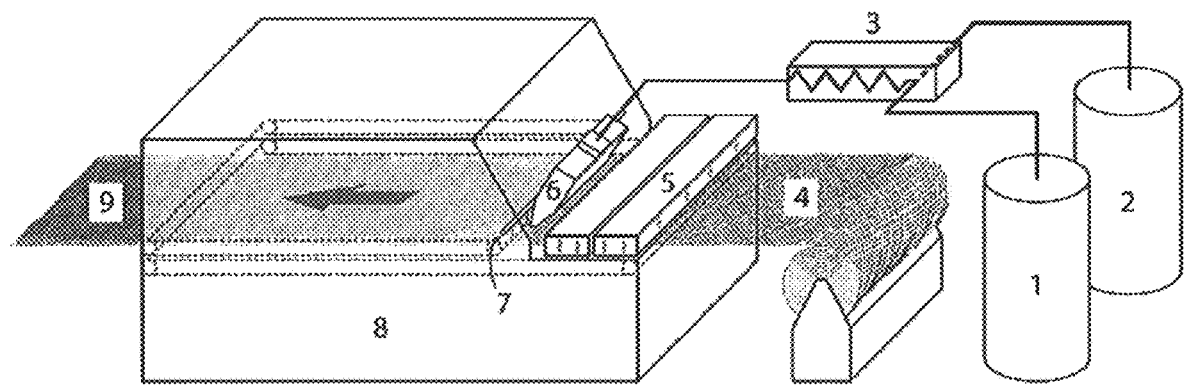
FIGS. 1A and 1B illustrate systems that may be used to produce prepregs that are fully impregnated with a thermoplastic polymer.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Thermoplastic Prepregs

The embodiments described herein relate to fully impregnated thermoplastic prepreg products, and specifically systems and methods for making the same. The prepreg products are fully impregnated with thermoplastic materials that allow the prepreg products to be reheated and molded into a given shape. The prepreg products are made using reactive resin materials, specifically monomers and oligomers. For example, in an exemplary embodiment the resin material is caprolactam, which is extremely sensitive to moisture, wherein even a small amount of moisture can affect the anionic polymerization of the caprolactam. Because of the high moisture sensitivity of these materials, achieving a high conversion rate of the reactive resin materials to polymers is very difficult.

In order to achieve a commercially viable prepreg product using monomer or oligomer materials (hereinafter resins, reactive resins, or resin materials), the conversion of the reactive resin to a polymer needs to be greater than 90% by weight and more commonly greater than 95% by weight. A person of skill in the art would recognize, the conversion of the reactive resin to a polymer may be readily determined. For example, a residual monomer or oligomer content in the prepreg can be measured via a solvent extraction method, which is described herein below. Specifically, when caprolactam is used as the reactive resin, the amount of residual caprolactam in a polyamide-6 (PA-6) prepreg can be measured via the extraction of caprolactam from a powder of grounded prepreg using hot water. The conversion of the reactive resin can be deduced based on the residual monomer or oligomer content. High molecular weights of the thermoplastic polymers are also typically desired. In preferred embodiments the resin material comprises caprolactam. The reactive resin material comprising caprolactam is extremely sensitive to moisture. The presence of moisture can stop or interfere with the anionic polymerization of caprolactam into a polyamide-6 polymer. For example, a moisture content of greater than 200 ppm in the resin can significantly interfere with the polymerization process and lower the conversion of the caprolactam material to below 90% by weight. The term "substantially moisture-free" or "substantially zero" in references to humidity recognizes that some level or amount of humidity may be present in the air. However, as used herein the term implies that any humidity present in the air is negligible, minor, insignificant, or otherwise inconsequential. For example, a "substantially moisture-free" environment may be created by employing a moisture purge mechanism that is operable to maintain the relatively humidity in the environment to be below 1% at under the temperature range of 5–35° C.

The systems and methods described herein are useful for manufacturing prepreg products using reactive resin materials. The resin conversion rate that is achieved via the systems and methods described herein is greater than 90% by weight and more commonly greater than 95% by weight. In most embodiments, the conversion rate of the resins is greater than 98% by weight or even greater than 99% by weight. As described herein, thermoplastic polymers in the prepreg products are formed via in-situ polymerization, which is not a common technique in manufacturing thermoplastic prepreg products. In addition, the systems and methods described herein are able to achieve this high conversion rate utilizing a continuous process, wherein a fiber mat, web, or fabric material (woven or nonwoven) is essentially moved constantly or continually throughout the manufacturing process. The continuous process greatly increases the efficiency of the manufacturing process, which decreases the overall cost of the final prepreg product. For example, the manufacturing time between coating of the reactive resin (e.g., caprolactam) to the formation of a fully impregnated thermoplastic prepreg may be less than 20 minutes and commonly less than 10 minutes. In many embodiments, this processing time may be less than 5 minutes.

The systems and methods described herein are also able to achieve full and complete impregnation of the prepreg with the thermoplastic polymer. It should be realized that the term "reactive resin" may be used in place of the term monomers and/or monomers or oligomers within the description and/or claims as desired. The viscosity of the reactive resin at the time when it is applied to a fiber mat, web, or fabric is lower than 500 mPa-s, typically lower than 100 mPa-s and more commonly lower than 10 mPa-s. The low viscosity of the reactive resin material allows that the resin to easily penetrate within and saturate the fiber mat, web, or fabric. The low viscosity of the reactive resin allows the resin to flow within and fully saturate either a single layer of the fiber mat, web, or fabric, or multiple layers of these materials. Accordingly, the systems and methods described herein are capable of producing prepregs that include multiple layers of materials with each layer being fully saturated or impregnated with the thermoplastic polymer materials. The final prepreg product can be made flexible with high content of reinforcing fibers. Because the prepreg products are flexible, the prepregs may be rolled into a rolled product.

The embodiments described herein provide a process and apparatus that utilizes mixing of reactive resin components, followed by application of the reactive resin components to a fiber mat, web, or fabric which may be formed from the various fiber materials described herein. The reactive resin components are then cured in an oven to form a fully impregnated prepreg having a thermoplastic polymer matrix. In a specific embodiment, caprolactam is polymerized to form polyamide-6 in the finished prepreg. The system is designed to isolate the reactive resin components from atmospheric moisture in order to achieve high conversion from monomer to polymer. Specifically, the system is designed to ensure a substantially moisture-free environment in the vicinity of the reactive resin coated fiber mat, web, or fabric. The systems and methods described herein are designed to isolate the reactive components from atmospheric moisture in order to achieve high conversion from monomer to polymer. This is achieved, in part, by controlling the environment in the vicinity of the production process and/or by removing residual moisture from the fiber mat, web, or fabric and/or any of the processing systems.

As used herein, the reactive resin means the resin materials that comprise monomers or oligomers capable of polymerizing to form thermoplastic polymers. The reactive resins may include lactams such as caprolactam and laurolactam and lactones. In an exemplary embodiment, the reactive resin comprises caprolactam. In some embodiments, mixtures of monomers and/or oligomers may be used. For example, mixture of caprolactam and laurolactam may be used, which will copolymerize in the curing oven to form copolymers with tailored properties. As used herein, the activator may be any material that activates and accelerates the polymerization of monomers or oligomers. Exemplary activators for the anionic polymerization of caprolactam include blocked isocyanates and N-acylcaprolactams. As used herein, the catalyst may be any material that catalyzes the polymerization of monomers or oligomers. Exemplary catalysts for the anionic polymerization of caprolactam include alkaline salt of caprolactam such as sodium caprolactamate.

Various terms are used herein to describe fiber-based products. For example, the term "fabric" is used in the application to describe fiber-based woven products. The application includes the following terms to describe fiber-based nonwoven products: mat, web, mesh, and the like. It should be understood that these terms may be used interchangeably in the embodiments. Unless specifically claimed, the disclosure is not limited to any one particular fiber-based product. Accordingly, it is contemplated that the terms may be replaced or changed in any of the embodiments described without departing from the intended scope of description. Furthermore, the term "fiber mat, web, or fabric" or "fiber-based product" may be substituted in the description or claims and is intended to cover any and all fiber-based products or components that are described or contemplated herein.

A common type of fiber that is used in the fiber mat, web, or fabric is glass fibers, although various other fibers could be used such as carbon fibers, basalt fibers, metal fibers, ceramic fiber, natural fibers, synthetic organic fibers such as aramid fibers, and other inorganic fibers. The term fabric as used herein refers to woven materials. The woven materials are materials that are produced by weaving multiple roving strands together. The term roving as used herein refers to a bundle of fibers that are positioned adjacent one another to form a rope, thread, or cord like component. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. The woven fabrics or cloths may be unidirectional, where all or most of the roving strands run or extend in the same direction, or may be bidirectional, wherein the roving strands run in two, typically orthogonal, directions. Various weaves may be used to form the fabrics described herein, including: plain weaves, twill weaves, satin weaves, multi-axial weaves, or stitching. The woven cloths or fabrics that are employed may contain any kind of woven fabric or multi-axial fiber material. The fabrics or mats may also contain chopped fibers in addition to or alternatively from the continuous fibers. The fabrics may be a hybrid from different type of fibers. For ease in describing the embodiments herein, the embodiments will generally refer to the use of glass fibers, although it should be realized that various other fiber types may be used.

The term mat as used herein refers to nonwoven materials. As briefly described above, nonwoven fiber mats are used in addition to or in place of the woven reinforcement fabrics. The nonwoven fiber mats are commonly formed of fibers that are mechanically entangled, meshed together, or chemically bonded, rather than being woven in a uniform direction. The nonwoven fiber mats exhibit more uniform strength characteristics in comparison to the woven reinforcement fabrics. Stated differently, the strength of the nonwoven fiber mats is typically less directionally dependent. In comparison, the strength of the woven reinforcement fabrics is directionally dependent whereby the fabrics or cloths exhibit substantially more strength in a direction aligned with the fibers and less strength in a direction misaligned from the fibers. The reinforcement fabrics or cloths are substantially stronger than the nonwoven mats when the tension is aligned with the fibers. For ease in describing the embodiments herein, the embodiments will generally refer to fabrics or mats, which is intended to apply to both woven fabrics or cloths and nonwoven fiber mats.

The fibers used in the fabrics or mats may be treated with a sizing composition including coupling agent(s) that promote bonding between reinforcing fibers and polymer resin. For example, the fibers may be sized with one or more coupling agents that covalently bond the thermoplastic resin to the fibers. Exemplary coupling agents may include coupling-activator compounds having a silicon-containing moiety and an activator moiety. Specific examples of coupling-activator compounds include 2-oxo-N-(3-(triethoxysilyl) propyl)azepane-1-carboxamide. Exemplary coupling agents may also include blocked isocyanate coupling compounds having a silicon-containing moiety and a blocked isocyanate moiety. Exemplary coupling agents may also include coupling compounds having a functional group that may react with the reactive resin to form covalent bond. Specific example of the coupling compounds having a functional group include silane coupling agent having amino, epoxy, or ureido functional groups.

The term thermoplastic polymer or material refers to polymers that are capable of being melted and molded or formed into various shapes multiple times. As such, the fully impregnated thermoplastic prepregs may be positioned in a mold and reformed or remolded into various desired shapes. Examples of polymer materials or resins that may be used with the embodiments herein include polyamides, specifically including polyamide-6.

The description and/or claims herein may use relative terms in describing features or aspects of the embodiments. For example, the description and/or claims may use terms such as relatively, about, substantially, between, approximately, and the like. These relative terms are meant to account for deviations that may result in practicing and/or producing the embodiments described herein. For example, the description describes mixtures from two holding tanks as being mixed into a "substantially homogenous mixture". The disclosure also describes purging a fiber mat, web, or fabric with "a substantially moisture-free gas" and that the fiber mat, web, or fabric is in "substantially constant movement" between a starting point and ending point. The term "substantially" is used in these descriptions to account for small deviations or differences from a complete homogenous mixture, or a completely moisture-free gas, or an entirely constant movement. For example, a skilled artisan would recognize that the moisture-free gas may include some negligible amount of moisture and that some negligible amount of non-homogeneity may be present within the homogenous mixture. The skilled artisan would also recognize that some negligible stoppage or non-movement of the fiber mat, web, or fabric may occur without departing from the spirit of the disclosure herein. These deviations of differences may be up to about 10%, but are typically less than 5%, or even 1%. A similar rationale applies to any of the other relative terms used herein.

In producing conventional thermoplastic prepregs, the process of fully impregnating or saturating the fiber mat, web, or fabric is rather expensive and/or difficult due to the high melt viscosity of the thermoplastic resin. In some instances, a solvent is added to the polymer resin/thermoplastic material to reduce the viscosity of the material. While the reduced viscosity may add in fully impregnating the reinforcement fabric, the solvent needs to be subsequently removed from the fabric after the polymer resin/thermoplastic material is impregnated within the fabric. Removal of the solvent commonly involves heating the fabric to evaporate the solvent, adding cost and environmental concerns. In contrast to these systems, no solvent is used in the reactive resin mixture described herein.

Other conventional technologies use pre-impregnated thermoplastic tapes of polymer resin and reinforcing fibers. These tapes are typically manufactured as a single layer by applying a molten polymer resin atop flattened rovings. For example, glass rovings may be passed over rollers to flatten and spread fibers that are then coated with a molten polymer resin. The tapes are then cooled with the glass fibers encased within the hardened polymer resin material. The tapes may then be used in producing other products, typically by stacking and welding several layers of tape together. The process of spreading fibers for resin impregnation typically limits to rovings; since spreading fibers in fabrics or mats is nearly impossible. In addition, the stacked tape is often rigid, which makes it difficult to mold intricate shapes.

In contrast to conventional prepregs, the production of the thermoplastic prepregs described herein is fast and simple. For example, fully saturating the fiber mat, web, or fabric is relatively easy since the reactive resin materials (e.g., caprolactam) have a low viscosity that is comparable to water. This low viscosity allows the resin materials to easily flow within and fully saturate a single or multiple layers of the fiber mat, web, or fabric. The capillary force of the rovings or fibers further aids in saturating the fiber mat, web, or fabric. The low viscosity of these materials also allows the materials to be applied to a constantly or continually moving sheet of material. The resins may then be converted into a thermoplastic polymer material so that the fiber mat, web, or fabric is fully impregnated with the thermoplastic material.

While the embodiment herein generally refers to the manufacture of polyamide-6 prepregs, other reactive resin systems can be easily adapted to work with the same or similar apparatus to form thermoplastic prepregs including other types of polyamides and blends of thermoplastic polymers such as the blends of polyamides and polyesters.

Having described several aspects of the embodiments generally, additional aspects will be evident with reference to the description of the several drawings provided below.

Thermoplastic Prepreg Systems

Figure 1B:
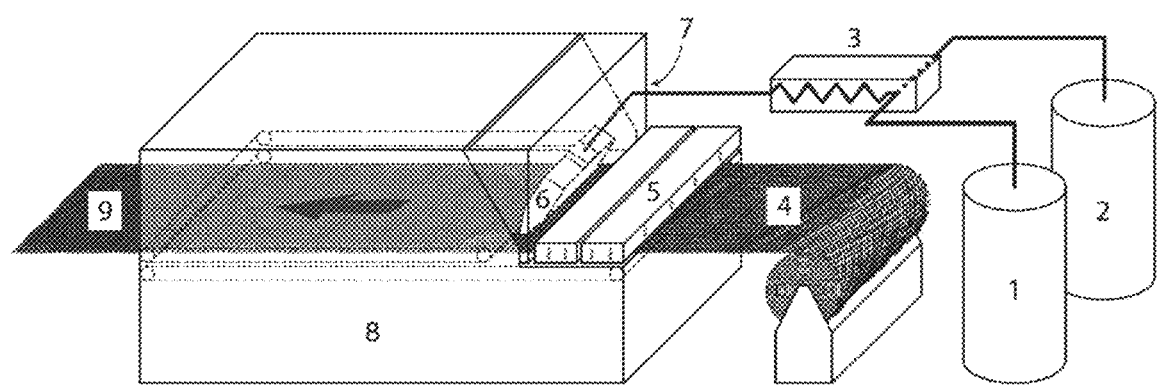

Referring now to FIGS. 1A and 1B, illustrated is a system that may be used to produce prepregs that are fully impregnated with a thermoplastic polymer. The systems of FIGS. 1A and 1B are capable of producing the fully impregnated thermoplastic prepregs in a continuous process, wherein a fabric or mat 4 is continually or constantly in movement through the system. Stated differently, the term continuous process means that the process is not interrupted or paused in performing any one process step. Rather, each step in the process is continually or constantly being performed. For example, the fabric or mat is continually moved from a rolled good, coated with the resin material, cured in the oven, and rolled into a final product. In contrast, conventional systems typically are halted or interrupted during the performance of one or more steps, such as the impregnation of fibrous substrates with high melt viscosity thermoplastic polymer resin.

In some embodiments, the system includes two vessels or holding tanks (i.e., 1 and 22). The holding tanks, 1 and 2, may be heated and purged with nitrogen to ensure the removal of any moisture, which could otherwise reduce the reactivity of the raw materials and consequently reduce the conversion of the resins to a polymer. One of the holding tanks (e.g., holding tank 1) may contain a mixture of a resin and a catalyst. In a specific embodiment, the holding tank (e.g., tank 1) includes caprolactam and a catalyst, such as sodium caprolactamate or any other catalyst. The other holding tank (e.g., tank 2) may contain a mixture of the resin and an activator. In a specific embodiment, the other holding tank (e.g., tank 2) includes caprolactam and an activator, such as N, N'-hexane-1,6-diylbis(hexahydro-2-oxo-1H-azepine-1-carboxamide) or any other activator. The holding tanks, 1 and 2, are heated to a temperature that allows the reactants to melt. In some embodiments, the temperature may be between about 70 and 120° C. The molten reactants (e.g., the resin and activator or catalyst) have a very low viscosity, for example, lower than 10 mPa-s.

The reactants from the two holding tanks, 1 and 2, are metered into a static mixer or mixing head 3 that ensures the correct ratio of the resin, activator, and catalyst. In one embodiment, the mixtures from the two holding tanks, 1 and 2, may be provided to the static mixer in a 1/1 ratio. The mixtures from the two holding tanks, 1 and 2, are thoroughly mixed in the static mixer 3 into a substantially homogenous mixture.

In some other embodiments, the system includes single or multiple vessels or holding tanks. Each of the vessels or holding tanks may contain individual components or mixtures of the reactive resin materials. Each of the vessels or holding tanks are heated to a temperature that allows the reactants to melt.

A fabric or mat 4 is unwound or otherwise provided to the system. The system may include a mechanism that unwinds the fabric or mat and moves the fabric or mat through the system and along or about the various processes. In some embodiments, the mechanism may include powered rollers or calendars and/or a conveyor system, that move the fabric or mat through the system.

In some embodiments, the activator is included on the surface of the fibers. The fabric or mat may consist of glass fibers that have been pre-treated with a sizing composition. For example, the sizing composition may include a coupling activator that covalently bonds the polymerization activator moiety to the glass fiber. In such instances, the bonding between the thermoplastic polymer and the fibers may be significantly strengthened or enhanced. When the fabric or mat includes the activator, only a single holding tank (e.g., tank 1) containing the resin and catalyst may be used, or a reduce amount of the activator may be mixed with the resin in the second holding tank (e.g., tank 2). In some embodiments, two holding tanks, 1 and 2, may be used and each holding tank may include a different resin material. For example, a first holding tank 1 may include caprolactam while the second holding tank 2 includes laurolactam. In such instances, a combination of two or more types of reactive monomers and/or oligomers may be applied to the fabric or mat.

In a specific embodiment, the fiber sizing contains a mixture of silane coupling agents, polymeric film formers, and other additives that are designed to enhance the interfacial bonding between the glass fiber and polyamide-6 matrix. Specifically, a reactive silane is used that allows some of the polymerization to be initiated directly from the glass surface, thus improving the coupling between the reinforcing fibers and the resin matrix to improve composite properties.

After the fabric or mat 4 is unwound, or during the unrolling of the fabric or mat, the fabric or mat may be subjected to a drying mechanism that removes residual moisture from one or more surfaces of the fabric or mat. For example, an infrared heater 5 may be used to raise the temperature of the fiber mat, web, or fabric and thereby remove any residual moisture. In a specific embodiment, the infrared heater 5 may be positioned atop or over the fabric or mat 4 to remove residual moisture. In some embodiments, a second heater can be positioned on an opposite side (e.g., bottom side) of the fabric or mat 4 to further aid in removal of residual moisture. In other embodiments, a pre-drying oven may be used in place of or in addition to the infrared heater 5. The preheating of the fabric or mat 4, and/or the preheating of the resin, may be employed to prevent the monomer/oligomer from solidifying upon contact with the fibers of the fabric or mat, which may ensure a good wet out of the resin at higher line speeds.

The resin mixture is then applied to the fabric or mat 4 using a resin application die 6 or other resin application mechanism. The resin application die 6 may be a slot die. The slot die 6 may be positioned atop or adjacent one or more surfaces of the fabric or mat 4. The resin mixture is typically applied as close as possible to an inlet of the curing oven 8 in order to minimize exposure of the resin material to the surrounding air. To minimize exposure to the surrounding air, the slot die 6 may be positioned directly adjacent to the inlet of the curing oven 8. In some embodiments, the slot of the slot die 6 may have an opening of about 1.0 mm or less that enables the use of a very thin die. The thin die allows the distal end of the die to be positioned substantially close to the curing oven 8 to minimize the exposure of the resin mixture to the surrounding environment. In some embodiment, the distal end of the slot die 6 may be positioned within 1.0 inches of the curing oven's inlet, and preferably within 0.5 inches of the inlet. The slot die 6 may be temperature controlled within a temperature range above the melting point of the reactive resin. For the reactive resin comprising caprolactam, the temperature range may be between 70° C. and 120° C. The slot die 6 may include a thermocouple and heating cartridge or other heating component to ensure that the slot die 6 remains within the desired temperature range.

While the embodiment herein utilizes a slot die 6 for application of the resin mixture to the fabric or mat 4, the low viscosity of such systems allows a wide range of application technologies including, but not limited to, spray application, curtain coating, dip and squeeze coating, kiss roll application, doctor blade application, or even powder coating of pre-ground solid resins where the curing oven can also be utilized to melt the reactive components.

The liquid handling lines between the two holding tanks, 1 and 2, and the static mixer 3 and/or between the mixer 3 and the slot die 6 are typically insulated to minimize heat loss as the resin mixtures flow through the handling lines. In some embodiments, the liquid handling lines are heated in addition to being insulated to ensure that the liquid materials (e.g., resins, catalyst, and activator) are maintained within a constant temperature range. Specifically, the liquid transport lines between the holding tanks, 1 and 2, (or solitary holding tank) and the mixer 3 and/or between the mixer 3 and the slot die 6 are insulated and heated to maintain the liquid materials within a temperature range above the melting point of the reactive resin. Controlling the temperature of the liquid materials ensures that the resin does not solidify and/or prematurely react within the handling lines.

In the above process, the temperature of the resin is typically maintained within a temperature range above the melting point of the reactive resin in order to maintain the resin in a liquid or molten state while preventing premature polymerization of the resin prior to the curing of the material in the oven. The resin components may need to be recirculated, such as between one or more holding tanks, 1 and 2, and the mixer 3. Ensuring that the resin is maintained with a desired temperature range is important to minimizing or eliminating premature resin polymerization and/or material build up in the system and/or liquid handling lines.

Of equal importance is the controlling the surrounding environment in the vicinity of the coated fabric or mat 4 to ensure that the resin mixture is not exposed to ambient moisture. Exposure of the resin mixture to ambient moisture may reduce the conversion of the resin, which may result in a resin to polymer conversion rate of less than 90%. The systems of FIGS. 1A and 1B are designed to isolate the resin mixture (i.e., reactive components) from atmospheric moisture in order to achieve high conversion from monomer/oligomer to polymer. In some embodiments, the entire system may be housed or enclosed in a room or area in which the environment is controlled to maintain a substantially moisture-free environment. Various dehumidification techniques can be used to remove moisture from the ambient air in the room or area. Exemplary dehumidification techniques include desiccant dehumidification, refrigerant dehumidification, and electrostatic dehumidification. In other embodiments, the system may employ a moisture purge mechanism that is operable to ensure that the humidity in the air surrounding the coated fabric or mat is substantially zero. In such embodiments, the moisture purge mechanism need be employed only in the vicinity of the slot die 6 since the fabric or mat 4 is free of the resin material prior to this point. The moisture purge mechanism may be positioned proximally of the slot die 6 or distally of the slot die 6 as desired. In either instance, however, the moisture purge mechanism should be positioned relatively close to the slot die 6 to minimize exposure of the resin mixture to the surrounding air. For example, the system may be enclosed in an area that is purged with a substantially moisture-free gas.

In a specific embodiment, the moisture purge mechanism includes an air/gas plenum or tube 7 of FIG. 1A that blows a moisture-free gas onto one or more surfaces of the coated fabric or mat 4. The air/gas plenum or tube 7 may be positioned atop the fabric or mat 4, or may be positioned on opposite sides of the fabric or mat as desired. In a specific embodiment, the air/gas plenum or tube 7 blows dry nitrogen atop or across either or both the top surface or the bottom surface of the fabric or mat 4. The air/gas plenum or tube 7 ensure that the area or vicinity around or adjacent the coated fabric or mat 4 and/or in the vicinity of the curing oven's inlet is kept substantially free of moisture. Minimizing the exposure of the resin material to moisture is critical to ensuring a high conversion rate of the resin material. Accordingly, the use of the drying mechanism (e.g., infrared heater 5) and/or moisture purge mechanism (e.g., air/gas plenum) is important to ensuring proper manufacturing of the prepreg. In another specific embodiment, the resin application mechanism as well as the coated fabric or mat may be enclosed in a box 7, as shown in FIG. 1B, that is purged with a substantially moisture-free gas.

After the fabric or mat 4 is coated and/or saturated with the resin and/or purge gas is applied to one or more surfaces of the coated fabric or mat 4, the resin impregnated fabric or mat 4 is then passed through a curing oven 8. The temperature of the curing oven 8 is maintained to ensure the completion of the polymerization of the resin to a thermoplastic polymer. Stated differently, the curing oven 8 is maintained at a polymerization temperature at which the monomers and/or oligomers start to polymerize.

For a reactive resin composition that includes caprolactam, the polymerization temperature may be about 120° C. or more (e.g., about 120° C. to about 220°). For prepreg manufacturing processes where the polymerized resin matrix is not melted, an upper limit on the polymerization temperature for the monomers and/or oligomers may be the melting temperature of the polymer. For example, a reactive resin composition that includes caprolactam may have a upper limit of a polymerization temperature that is the melting temperature of the PA-6 polymer (i.e., ~220° C.). The coated fabric or mat 4 may be exposed to the curing oven 8 for a time which is sufficient to ensure complete polymerization of the resin material. For example, for a reactive resin composition that includes caprolactam, the residence time of the coated fabric or mat in the curing oven may be about 3 minutes to ensure the complete polymerization of caprolactam.

As noted above, when the reactive resin composition is a combination of two or more types of reactive monomers and/or oligomers, the heating temperature of the resin-fiber mixture may be chosen to be above a threshold polymerization temperature of one type of monomer/oligomer but below a threshold polymerization temperature of the other type of monomer/oligomer. For example, a reactive resin composition that includes both caprolactam and CBT may be heated to 120-170° C., which may polymerize the caprolactam to PA-6 without significantly polymerizing the CBT to polybutylene terephthalate (PBT). The resulting fiber-resin amalgam will include a polymerized resin matrix of PA-6 combined with a polymerizable resin of CBT. The fiber-resin amalgam may be processed into a reactive prepreg that includes a polymerized resin matrix of PA-6 and polymerizable CBT. The reactive prepreg may be incorporated into a fiber-reinforced article, where the processing conditions may include polymerizing the CBT into PBT. In other embodiments, mixtures of monomers and/or oligomers may be used. For example, a mixture of caprolactam and laurolactam may be used, which will copolymerize in the curing oven to form copolymers with tailored properties.

In some embodiments, the coated fabric or mat 4 is subjected to a press mechanism that facilitates in complete wet-out of the reinforcing fibers by the resin. In one embodiment, the press mechanism may include one or more calendars that press or squeeze the resin through the fabric or mat 4. In another embodiment, the curing oven 8 may be a double belt compression oven where the pressure on the belts is adjustable to facilitate complete wet-out of the reinforcing fibers by the resin. The exposure of the coated fabric or mat to ambient moisture may be minimized by using double belt press that is oil or electrically heated.

Upon exiting the curing oven 8, the fully cured prepreg 9 may be collected. In some embodiments, the system includes a winding mechanism that is configured to wind the fully cured prepreg 9. In other embodiments, the fully cured prepreg may be cut into sheets, which may be stacked atop one another.

The systems of FIGS. 1A and 1B are designed so that the above process is able to be performed in a time of 20 minutes or less, and more commonly 10 minutes or less. In some embodiments, the process may be performed in 5 minutes or less. Specifically, the time period between when the fabric or mat 4 is initially unwound to when the prepreg exits the curing oven 8 may be 20 minutes or less, 10 minutes or less, or in some embodiments 5 minutes or less. This speed and impregnation efficiency is not achievable via conventional systems using polymer resin materials. Moreover, the speed and efficiency is not drastically affected when multiple stacked layers of the fabric or mat 4 are employed. Rather, the low viscosity resin mixture is able to easily penetrate through and saturate the multiple stacked layers of the fabric or mat 4 so that the processing time of the stacked layers of the fabric or mat remains low. Full impregnation of the stacked layers of the fabric or mat 4 is achievable due to the low viscosity of the resin materials.

Thermoplastic prepregs, which are sometimes referred to as an organosheets, offer some superior properties such as impact resistance, thermoformability, and recyclability, as compared to thermoset prepregs. Because of the directionality of fiber orientation in fabrics, however, conventional thermoplastic prepregs have anisotropic mechanical properties, which poses significant challenges in designing composite parts to replace incumbent isotropic materials such as steel and aluminum. In addition, fabric-based thermoplastic prepregs may have limited conformability, which may increase the difficulty in forming composite parts with complex geometry.

Hybrid Thermoplastic Prepregs

As described herein, in some embodiments the thermoplastic prepreg may be formed of chopped strands or fibers (hereinafter chopped fibers). Specifically, the fiber material in the prepreg may comprise or consist of chopped fibers. The use of chopped fibers in a thermoplastic prepregs may result in a prepreg with more isotropic mechanical properties and increased conformability, while maintaining high strength and impact resistance. Such thermoplastic prepregs may be formed in a continuous manufacturing process that may include: (1) in-line chopping rovings into long fibers or strands, which are dispensed uniformly onto a moving belt to form an un-bonded chopped strand mat; (2) impregnating the chopped fiber or strand mat with a reactive resin such as molten caprolactam; (3) pressing the coated chopped fiber or strand mat to fully saturate the mat with the reactive resin (e.g., caprolactam); and (4) in-situ polymerizing the reactive resin in an oven to form the chopped fiber or strand thermoplastic prepreg. To ensure the full polymerization of the reactive resin, and in particular caprolactam, the fibers or rovings may be in-line dried prior to chopping, and the chopped fiber or strand mat may be further dried prior to the impregnation with the reactive resin (e.g., caprolactam). The system is typically further configured to maintain a moisture free environment in the vicinity of the reactive resin coated chopped fiber or strand mat prior to subjecting the reactive resin coated chopped fiber or strand mat to the curing oven. Maintaining a moisture free environment substantially prevents exposure of the reactive resin, and in particular caprolactam, to moisture.

The term chopped fibers relates to fibers that are chopped from continuous rovings or tows. Chopped fibers may have length from 10 mm to 100 mm, preferably from 25 mm to 50 mm. The fibers that are employed herein may be selected from, but are not limited to, the following types of fibers: glass fibers, carbon fibers, basalt fibers, polymer fibers including aramid, natural fibers including cellulosic fibers, and other inorganic fibers. The fibers can be treated with coupling agents, which may improve interfacial bonding between fibers and thermoplastic resin matrix.

The chopped fibers typically form a chopped fiber or strand mat, which is a fiber mesh or web of unbonded chopped fiber segments. The term un-bonded implies that the mesh or web of chopped fibers is not mechanically or chemically coupled or bonded together, or coupled together via some other means. On the other hand, nonwoven mats typically comprise fibers randomly laid atop one another and bonded or coupled together with an applied binder or adhesive. In other embodiments, mechanically coupling may be used in place of chemical coupling. Mechanically coupling of the fibers may be achieved by mechanical needling in which a needle or rod is inserted into the fiber web to encourage or effect entanglement of the fibers. In some instances, nonwoven mats may include both chemical and mechanical coupling of the fibers. Woven fabrics or mats are mechanically coupled together via the weaving of the fiber rovings or tows together.

In contrast to these conventional nonwoven mats, in the instant application the web or mesh of chopped fibers is unbonded so that individual chopped fibers are not chemically or mechanically bonded—i.e., a binder or adhesive is not employed nor are mechanical bonding techniques, such as mechanical needling. Rather, the chopped fibers are merely laid atop one another with minimal physical engagement. The result is that, prior to the addition of the reactive resin, the web or mesh of chopped fibers may be easily separated or pulled apart, such as by the application of a gas over the fiber web or mesh. It should be appreciated that a minimal degree of physically entanglement or engagement will likely be encountered due to the random orientation of the chopped fibers in the web or mesh, but that in general the chopped fibers remain uncoupled or unbonded from one another so that the web or mesh has minimal structural integrity prior to application of the reactive resin and the subsequent polymerization to form thermoplastic polymer.

Once the reactive resin has been added to the chopped fiber web or mesh, the thermoplastic polymer resulted from in-situ polymerization of the reactive resin may function to bond or adhere the chopped fibers together. Thus, the thermoplastic polymer functions as the adhesive matrix that bonds or adheres the chopped fibers together. In some embodiments, the chopped fiber web or mesh may be used with a fabric or nonwoven mat, such as those described herein. In such embodiments, the chopped fiber web or mesh may be positioned on a single side or both sides of the fabric or nonwoven mat. Because of the very low viscosity of thermoplastic resin that is commonly employed (e.g., caprolactam), complete impregnation of the chopped fiber web or mesh is easily achieved in a short period of time, which ensures a high-volume manufacturing process. Thus, the process described herein has significant advantages in both production efficiency and composite properties, as compared to conventional polymer melt-impregnation processes in which highly viscous polymeric resin melts are used to impregnate reinforcing fibers.

While the description herein generally refers to the use of an un-bonded chopped fiber web or mesh, it should be appreciated that in some instances it may be desirable to couple the chopped fibers together via chemical means, mechanical means, or some other means. The reactive resin may then be added to the coupled or adhered chopped fiber web or mesh. To simplify the description of the various embodiments, the chopped fiber web or mesh will be generally referred to as a chopped fiber web or mesh or more simply a fiber web or mesh. This general description of a chopped fiber web or mesh is meant to describe both an un-bonded or non-adhered chopped fiber web or mesh as well as a bonded or adhered chopped fiber web or mesh. The use of the term in the claims is likewise meant to cover both the un-bonded/non-adhered chopped fiber web or mesh as well as the bonded or adhered chopped fiber web or mesh unless the claims specifically recite one of these fiber webs or meshes. Thus, the generic description of a chopped fiber web or mesh in the description and/or claims may be substituted with the more specific description of an unbonded or non-adhered chopped fiber web or mesh or a bonded or adhered chopped fiber web or mesh if desired.

The resulting chopped fiber thermoplastic prepreg comprises randomly oriented chopped fibers and possess largely isotropic mechanical properties. Due to the excellent conformability of the chopped fibers, the chopped fiber thermoplastic prepreg described herein is capable of being formed into complex-shaped composite parts with deep draws and large curvatures, via high throughput processes such as compression molding. Additional aspects and features of the chopped fiber thermoplastic prepreg will be appreciated in regards to the description of the various embodiments provided below.

Lightweight Prepreg

In some embodiments it may be desirable to decrease the density of the thermoplastic prepreg. Such prepregs may be generally referred to as lightweight prepregs, since they are lighter in density than conventional prepregs. Lightweight prepregs may be particularly useful in applications where weight is an issue or concern. The density of the thermoplastic prepreg may be reduced by adding a lightweight filler material to the thermoplastic prepreg. The term "lightweight filler material" means a material that has a density of between 0.1 and 1.0 g/cm$^3$. The density of lightweight filler material is determined per ISO 12154:2014 test method. In a specific embodiment the lightweight filler material may be hollow glass microspheres, which are also commonly referred to as glass bubbles. In other embodiments, the lightweight filler material may be perlite or other lightweight materials.

The use of the lightweight filler material results in thermoplastic prepregs that have a reduced density in comparison with conventional thermoplastic prepregs. The lightweight thermoplastic prepregs exhibit high strength and impact resistance despite the reduced density. Unlike conventional systems that introduce filler materials with the polymer resin and fibers in an extrusion processes, the systems described herein are able to introduce the lightweight filler material to the prepreg fibers without fiber attrition. The extrusion process employed in conventional systems typically breaks the fibers into much shorter lengths. The thermoplastic prepregs that are formed from the systems described herein may include fibers that are significantly longer in length than those of conventional thermoplastic composites produced via an extrusion process. For example, the thermoplastic prepregs that are formed from the systems described herein may include fibers that are 10 mm or longer; while the conventional thermoplastic composites that are formed via an extrusion process may include fibers that are 1 mm or shorter.

The reinforcement components that are used in conventional thermoplastic prepregs, including glass fibers, have higher density than thermoplastic resin. For example, the glass fibers that are employed in thermoplastic prepregs typically have a density of around 2.6 grams per cubic centimeter (g/cm$^3$). For applications such as automotive, the density and weight of components is critical for fuel efficiency.

In order to reduce the density of the prepregs, a light weight filler material may be added to the thermoplastic prepreg. For example, hollow glass microspheres commonly have densities ranging from 0.10 to 0.60 g/cm$^3$ and are therefore, significantly lighter than both the fibers and polymer materials of conventional thermoplastic prepregs. In some preferred embodiments, hollow glass microspheres that may be employed have a density lower than 0.40 g/cm$^3$.

Since the lightweight filler material is significantly lighter in weight than both the glass fibers and polymeric material, adding an appreciable amount of the lightweight filler material to the thermoplastic prepreg substantially reduces the overall density of the thermoplastic prepreg. The lightweight filler material reduces the overall density of the thermoplastic prepreg by occupying a volume or space within the prepreg that would otherwise by filled or occupied by the heavier glass fiber and/or polymeric materials. The weight percentage of hollow glass microspheres in the thermoplastic prepreg may be between 1% and 30%, preferably between 2% and 20%, and more preferably between 3% and 10%, based on the total weight of the prepreg.

In some embodiments, the lightweight filler material may be added to the reactive resin described herein (e.g., monomers and/or oligomers) since the viscosity of the reactive resin in the molten state is very low. For example, the viscosity of the reactive resin that includes caprolactam is lower than 10 mPa-s at 80° C. In conventional systems, the lightweight filler material typically cannot be added to the thermoplastic polymer materials because the viscosity of such materials is substantially greater than the reactive resins described herein (i.e., substantially greater than 10,000 mPa-s). The low viscosity of the reactive resin enables the lightweight filler material to be mixed with the reactive resin and subsequently applied to the fiber reinforcement materials through various methods, such as via a slot die, curtain coater, roller coater, spray nozzle or mechanism, and the like. In other embodiments, the hollow glass microspheres may be combined with the reinforcing fibers prior to the application of the reactive resin. For example, a microsphere application mechanism may be positioned above the fabric, mat, web, or mesh so that the hollow glass microspheres are applied atop or within the fabric, mat, web, or mesh. The reactive resin may then be applied to the fiber mat, web, or mesh that incorporates the hollow glass microspheres. The thermoplastic prepreg may be formed via in-situ polymerization of the reactive resin.

Figure 22:
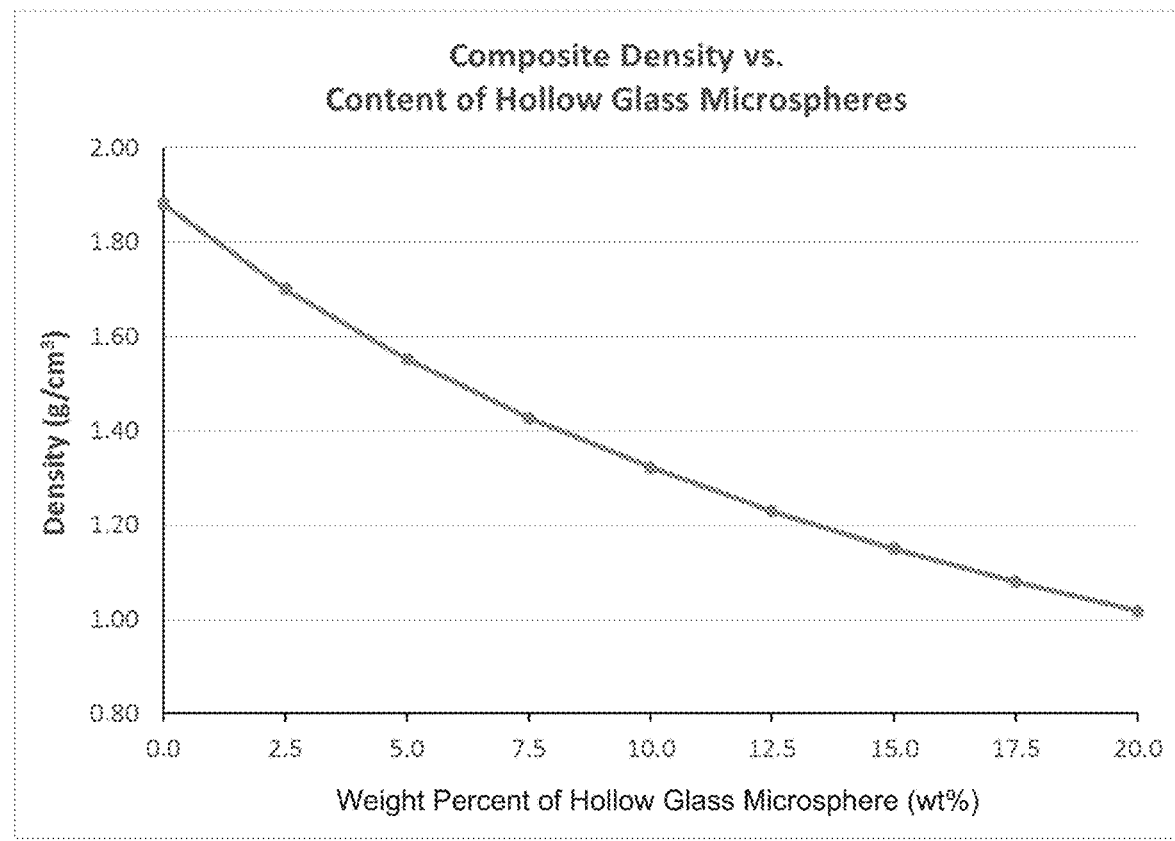
FIG. 22 illustrates a graph of a density reduction in a thermoplastic prepreg due to the addition of a lightweight filler material to the thermoplastic prepreg.

In some embodiments, the lightweight filler material may include a coating that facilitates bonding between the filler material and the thermoplastic resin. For example, a silane coating may be added to the surface of the hollow glass microspheres to increase the interfacial strength between the microspheres and resin matrix. In addition to being lightweight, the glass microspheres exhibit excellent strength properties and thus, the use of the hollow glass microspheres in the thermoplastic prepreg do not significantly negatively affect the strength properties of the prepreg. FIG. 22 illustrates a graph showing the density reduction in comparison with the weight percentage of hollow glass microspheres that are present within the thermoplastic prepreg. As illustrated, the density of the thermoplastic prepreg (e.g., glass fiber reinforced polyamide-6 prepreg) was reduced by the introduction of the hollow glass microspheres (e.g., Glass Bubbles S38HS sold by 3M™) into prepreg. In FIG. 22, the density of the thermoplastic prepreg was reduced from about 1.90 g/cm$^3$ to about 1.00 g/cm$^3$ as the weight percentage of the hollow glass microspheres increased from 0.0 percent to about 20 percent. The density of the thermoplastic prepreg containing hollow glass microspheres is typically lower than 1.8 g/cm$^3$, preferably lower than 1.5 g/cm$^3$, and more preferably lower than 1.3 g/cm$^3$. The reduction in density was very dramatic for the amount of hollow glass microspheres that were added to the thermoplastic prepreg. The resin content of the thermoplastic prepreg of FIG. 22 was roughly 30 percent by weight and the density of the hollow glass microspheres was roughly 0.38 g/cm$^3$.

The lightweight filler material may be homogenously dispersed throughout the thermoplastic prepreg; may form a layer on top of the fabric, mat, web, or mesh; or may be sandwiched between opposing layers of fabric, mats, webs, or meshes. The penetration of the lightweight filler material into the fabric, mat, web, or mesh may depend on how loosely the fibers are positioned in relation to one another. For example, hollow glass microspheres may be able to easily penetrate into the fabric, mat, web, or mesh when the fibers are relatively loose in relation to each other. In other embodiments, the lightweight filler material may be combined with chopped fibers in a hopper. The chopped fibers and lightweight filler material may be scattered or dispersed via a fiber scattering unit. In yet other embodiments, the filler material application mechanism may be positioned immediately adjacent a fiber chopper or fiber scattering mechanism so that the lightweight filler material is added relatively homogenously to the chopped fiber web or mesh. In the above described embodiments, the lightweight filler material may disperse homogenously or uniformly throughout the fabric, mat, web, or mesh.

In other embodiments, the lightweight filler material may form a layer atop the fabric, mat, web or mesh. For example, when the fibers are positioned relatively tightly together, such as when the fibers are tightly woven, or tightly packed in a nonwoven configuration, the hollow glass microspheres may be filtered by the fibers and form a layer atop the fabric, mat, web, or mesh. In such embodiments, a second fabric, mat, web, or mesh may be positioned atop hollow glass microspheres so that the microspheres are sandwiched between opposing fabric, mat, web, or mesh layers. In other embodiments, a second fabric, mat, web, or mesh is not positioned atop the layer of hollow glass microspheres so that the layer of glass microspheres remains exposed to the surrounding environment.

Because of the low melt viscosity of the reactive resin, complete impregnation of both the hollow glass microspheres and the reinforcing fibers can be easily achieved in a short period of time, ensuring a high-speed manufacturing process. As such, the process described herein has significant advantages in both production efficiency and composite properties, as compared to conventional melt-impregnation processes in which highly viscous polymeric resin melts are used to impregnate reinforcing fibers and/or hollow glass microspheres.

The fiber reinforcement of the lightweight prepreg can include any of the fabric, web, mesh, or mat configurations described herein, including fabrics of various types, sizes, and arrangements; nonwoven mats of various types, sizes, and arrangements; fiber webs or meshes of various types, sizes, and arrangements; or any combination thereof. The fabric, webs, meshes, or mats can include one or more uniform layers and/or one or more layers of fabric, webs, meshes, or mats. The reinforcing fibers may be selected from, but not limited to, to following fiber types: glass fibers, carbon fibers, basalt fibers, polymer fibers including aramid, natural fibers including cellulosic fibers, and other inorganic fibers. The reinforcing fibers can be treated with coupling agents, which may improve interfacial bonding between fibers and the thermoplastic resin matrix. The reinforcing fibers can be continuous fibers, chopped fibers, or a combination of both.

As briefly described herein, the lightweight prepreg may have a lower density than conventional thermoplastic prepreg. For example, the lightweight prepreg may have a density of between 1.0 and 1.7 g/cm$^3$. The lightweight prepreg may comprise: a) 30 to 80% by weight of fibrous material; b) 20 to 70% by weight of thermoplastic polymer; and c) 1 to 30% by weight of lightweight filler. In preferred embodiments, the lightweight prepreg may comprise: a) 50 to 70% by weight of fibrous material; b) 30 to 50% by weight of thermoplastic polymer; and c) 2 to 15% by weight of lightweight filler.

Additional Thermoplastic Prepreg Systems

Figure 5:
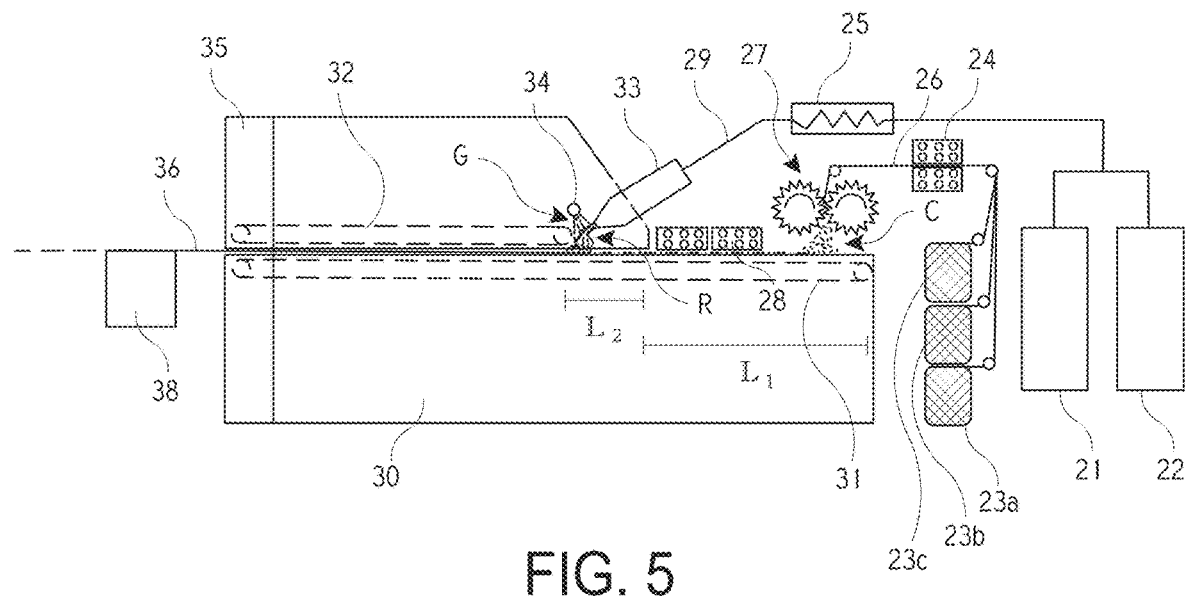
FIGS. 5-8 illustrate systems that may be used to produce prepregs that are fully impregnated with a thermoplastic polymer.

Referring now to FIG. 5, illustrated is a system that may be used to produce thermoplastic prepregs that include a chopped fiber web or mesh. As described herein, the resulting thermoplastic prepregs are fully impregnated with a thermoplastic polymer. The system of FIG. 5 is capable of producing the fully impregnated thermoplastic prepregs in a continuous process, in which the chopped fiber web or mesh is continually or constantly in movement through the system.

As illustrated in FIG. 5, the system may include two vessels or holding tanks (i.e., 21 and 22). At least one of the holding tanks functions as a storage and delivery tank of a reactive resin, which is typically a monomer or oligomer that is polymerizable into a thermoplastic polymer. In some embodiments, the monomers or oligomers may include or consist of lactams, lactones, cyclic butylene terephthalate (CBT), methyl methacrylate, precursors of thermoplastic polyurethane, or mixtures thereof. The lactams may include or consist of caprolactam, laurolactam, or mixtures thereof. The holding tanks, 21 and 22, may be heated and purged with nitrogen to ensure the removal of any moisture, which could otherwise reduce the reactivity of the raw materials and consequently reduce the conversion of the resins to a polymer. As previously described, one of the holding tanks (e.g., holding tank 21) may contain a mixture of a resin and a catalyst. In a specific embodiment, the holding tank (e.g., tank 21) may include caprolactam and a catalyst, such as sodium caprolactamate or any other catalyst. The other holding tank (e.g., tank 22) may contain a mixture of the resin and an activator. In a specific embodiment, the other holding tank (e.g., tank 22) includes caprolactam and an activator, such as N, N'-hexane-1,6-diylbis(hexahydro-2-oxo-1H-azepine-1-carboxamide) or any other activator. The holding tanks, 21 and 22, may be heated to a temperature that allows the reactants to melt, such as between about 70 and 120° C. for the reactive resin that includes caprolactam. The molten reactants (e.g., the resin and activator or catalyst) have a very low viscosity, for example, lower than 10 mPa-s. The viscosity of molten reactants can be measured according to the test method ISO 3104:1999. As an example, molten caprolactam at the temperature of 80° C. has a viscosity of 8.5 mPa-s, as measured using ISO 3104:1999.

The reactants from the two holding tanks, 21 and 22, are typically metered into a static mixer or mixing head 25 that ensures the correct ratio of the monomers and/or oligomers, activator, and catalyst is delivered to the chopped fiber web or mesh. In one embodiment, the mixtures from the two holding tanks, 21 and 22, may be provided to the static mixer in a 1/1 ratio. The mixtures from the two holding tanks, 21 and 22, are thoroughly mixed in the static mixer 25 into a substantially homogenous mixture. The static mixer 25 may be heated to a temperature that allows the reactants to remain in a liquid non-polymerized state, such as between about 70 and 120° C. for the reactive resin that includes caprolactam.

The system also includes a double belt mechanism that includes an upper belt 32 and a lower belt 31. The upper belt 32 is positioned atop the lower belt 31 and the two belts are configured to compress or squeeze a fiber mesh that is passed through the double belt mechanism. At least a portion of the double belt mechanism is positioned within a curing oven 30. In some embodiments, the top belt 32 is fully enclosed within the curing oven 30. The lower belt 31 has a longitudinal length that is substantially longer than the upper belt 32 so that at least a portion of the lower belt 31 extends outward from the curing oven 30. As illustrated, the lower belt 31 may extend outward from a front edge of the curing oven 30 by a length $L_1$, which is typically between 2 and 15 feet and more commonly between 3 and 10 feet. In a specific embodiment, the extended length $L_1$ of the lower belt 31 is between 6 and 9 feet and more specifically about 8 feet.

The lower belt 31 typically extends outward from the upper belt 32 and/or curing oven 30 so that one or more of the components of the system may be positioned atop the lower belt 31. For example, a fiber chopper 27 is positioned above the lower belt 31. The fiber chopper 27 is configured to cut fiber strands or rovings 26 into chopped fiber strands C, which form the chopped fiber web or mesh. The fiber chopper 27 is positioned above the lower belt 31 so that as the fibers strands or rovings 26 are cut into the individual chopped fiber strands C, the chopped fiber strands C fall atop the lower belt 31 and form the fiber web or mesh. The fiber strands or rovings may be provided via one or more spools, 23a-c, that may be positioned on a creel. The strand or roving that is provided by each spool, 23a-c, may be similar in fiber type or size or may differ from the strand or roving provided by another spool. Thus, the chopped fiber web or mesh may be formed from the same type of fiber strands or rovings 26 or may be formed from a variety of different fiber strands or rovings. For example, the chopped fiber web or mesh may include a combination of different sized fibers and/or a combination of different types of fibers. In some instances, two or more different types of fiber strands or rovings, including but not limited to glass fiber, carbon fiber, and aramid fiber, may be cut by the fiber chopper 27 simultaneously, forming hybrid fiber web or mesh.

In some embodiments, the fibers of the fiber strands or rovings 26 may include a sizing composition having a coupling agent that promotes bonding between the chopped fibers and the thermoplastic polymer. For example, the sizing composition may include a coupling activator that covalently bonds the polymerization activator moiety to the chopped fibers. In such instances, the bond between the thermoplastic polymer and the chopped fibers may be significantly strengthened or enhanced. In a specific embodiment, the fiber sizing contains a mixture of silane coupling agents, polymeric film formers, and other additives that are designed to enhance the interfacial bonding between the chopped fibers and a polyamide-6 matrix. Specifically, a reactive silane may be used that allows some of the polymerization to be initiated directly from the chopped fiber surface, thus improving the coupling between the reinforcing fibers and the resin matrix to improve composite properties.

In other instances, the activator may be included on the surface of the fibers of the fiber strands or rovings 26 so that the chopped fiber web or mesh includes the activator. In such instances, only a single holding tank (e.g., tank 21) that contains the resin and catalyst may be used in the system, or a reduced amount of the activator may be mixed with the resin in the second holding tank (e.g., tank 22). In some embodiments, the two holding tanks, 21 and 22, may each include a different resin material. For example, a first holding tank 21 may include caprolactam while the second holding tank 22 includes laurolactam. In such instances, a combination of two or more types of reactive monomers and/or oligomers may be applied to the chopped fiber web or mesh.

The system may include a drying mechanism 24 that is configured to dry the fiber strands or rovings 26 as the fiber strands or rovings 26 are unwound from the respective spools, 23a-c, and before the fiber strands or rovings 26 are cut via the fiber chopper 27. The drying mechanism 24 may be a tubular heater through which the fiber strands or rovings 26 are pulled. The system may include a single tubular heater through which all the fiber strands or rovings 26 are pulled, or may include a tubular heater through which each fiber strand or roving is individually pulled as it is unwound from the respective spool, 23a-c. The use of the drying mechanism 24 reduces or eliminates residual moisture that may be present on the fiber strands or rovings 26. The drying mechanism 24 may have a drying temperature of between 100° C. and 200° C., and more commonly between 100° C. and 150° C.

The fiber chopper 27 cuts the fiber strands or rovings 26 into individual chopped fiber strands C, which fall atop the lower belt 31 and form the chopped fiber web or mesh. The individual chopped fiber strands C are randomly oriented or arranged atop the lower belt 31 and form a fiber web or mesh having a thickness and/or density that depends on the speed of the lower belt 31, the chopping speed of the fiber chopper 27, the number and/or size of fiber strands or rovings 26, and the like. The chopped fiber web or mesh is typically not subjected to chemical or mechanical bonding and thus, the chopped fiber web or mesh is typically un-bonded or un-adhered. Specifically, prior to application of the reactive resin, the chopped fiber web or mesh typically does not include a binder that bonds or adheres the fiber mesh together and the chopped fiber web or mesh is typically not subjected to a mechanical entangling process, such as mechanical needling.

The lower belt 31 carries or conveys the chopped fiber web or mesh toward other components of the system and/or toward an entrance to the curing oven 30. The chopped fiber web or mesh may be subjected to a drying mechanism 28 that removes residual moisture from the chopped fiber web or mesh. The drying mechanism 28 may be positioned atop the lower belt 31 so that it is above the chopped fiber web or mesh. The drying mechanism 28 dries the chopped fiber web or mesh as the chopped fiber web or mesh is moved underneath the drying mechanism 28. The drying mechanism 28 may be an infrared heater that raises the temperature of the chopped fiber web or mesh and thereby removes any residual adventitious moisture. One of the reasons for the extended length $L_1$ of the lower belt 31 is to ensure that the chopped fiber web or mesh may be sufficiently dried before the application of the reactive resin and to ensure that the chopped fiber web or mesh may be subjected to each of the components of the system. The drying mechanism 28 may remove trace amounts of surface moisture from the chopped fiber web or mesh.

After the chopped fiber web or mesh is dried via the drying mechanism 28, the reactive resin is applied to the chopped fiber web or mesh using a resin application mechanism 33 that is positioned atop the lower belt 31 and above or adjacent the chopped fiber web or mesh. The resin application mechanism 33 applies the reactive resin R, which is typically monomers and/or oligomers of the thermoplastic material, to the chopped fiber web or mesh as the chopped fiber web or mesh is moved past and typically underneath the resin application mechanism 33. In some embodiments, the resin application mechanism 33 is a slot die having a narrow opening through which the reactive resin R flows, such as an opening of about 1.0 mm or less. The reactive resin R is delivered to the resin application mechanism 33 from the static mixer 25 via tubing 29, which may be heated to maintain a temperature of the reactive resin. In some embodiments, the resin application mechanism 33 is configured to apply a lightweight filler material (e.g., hollow glass microspheres) to the chopped fiber web or mesh as the chopped fiber web or mesh is moved past and typically underneath the resin application mechanism 33. In such embodiments, the lightweight filler material is applied to the chopped fiber web or mesh simultaneously with the reactive resin R. The lightweight filler material may be contained in either or both holding tanks, 21 and 22, along with the reactive resin R or other materials. The lightweight filler material may be filtered by the chopped fiber web or mesh and form a layer atop the chopped fiber web or mesh, or may be dispersed through the chopped fiber web or mesh as illustrated herein.

The reactive resin R may be applied to the chopped fiber web or mesh close to the curing oven 30 in order to minimize exposure of the reactive resin to the surrounding air and environment. In some embodiments, the resin application mechanism 33 may be positioned within 10 inches of an inlet of the curing oven 30 and more commonly within 5.0 inches or even 1.0 inches of the curing oven's inlet. In other embodiments, a distal or delivery end of the resin application mechanism 33 may be positioned within a hood or cover of the curing oven 30 as illustrated in FIG. 5. The resin application mechanism 33 may be temperature controlled within a desired temperature range, for example between a temperature of 70° C. and 120° C. for the reactive resin that includes caprolactam. The resin application mechanism 33 may include a thermocouple and heating cartridge or other heating component to ensure that the resin application mechanism 33 remains within the desired temperature range.

As an alternative to the slot die, the resin application mechanism 33 may also include a spray application, curtain coating, dip and squeeze coating, kiss roll application, doctor blade application, or even powder coating of pre-ground solid resins in which the curing oven melts the reactive components.

As previously described, the liquid handling lines 29 between the holding tanks, the static mixer, and the resin application die are typically insulated and/or heated to minimize heat loss as the resin mixtures flow through the handling lines. Controlling the temperature of the liquid materials ensures that the resin R does not solidify and/or prematurely react within the handling lines. The temperature of the reactive resin is also typically maintained within a desired temperature range in order to maintain the reactive resin in a liquid or molten state while preventing premature polymerization of the resin prior to the curing of the material in the oven. Similarly, once the chopped fiber web or mesh is coated with the reactive resin R, the surrounding environment in the vicinity of the coated chopped fiber web or mesh is typically controlled to ensure that the reactive resin is not exposed to ambient moisture in the environment. Exposure of the reactive resin R to ambient moisture may reduce the conversion of the reactive resin, which may result in a degree of polymerization less than 90%.

As previously described, the surrounding environment may be controlled by housing or enclosing the system in a room or area in which the environment is maintained substantially moisture-free. Various dehumidification techniques can also be used to remove moisture from the ambient air in the room or area. Exemplary dehumidification techniques include desiccant dehumidification, refrigerant dehumidification, and electrostatic dehumidification. More commonly, the system employs a moisture purge mechanism that is operable to ensure that the humidity in the air surrounding the coated chopped fiber web or mesh is substantially zero. For example, the system may employ a moisture purge mechanism that is operable to maintain the relatively humidity in the air surrounding the coated chopped fiber web or mesh to be below 1%. Typically the moisture purge mechanism need only be employed in the vicinity of the resin application mechanism 33 since the chopped fiber web or mesh is free of the reactive resin R prior to the resin application mechanism 33. The moisture purge mechanism may be positioned proximally of the resin application mechanism 33 or distally of the resin application mechanism 33 as desired. In either instance, however, the moisture purge mechanism should be positioned relatively close to the resin application mechanism 33 to minimize exposure of the reactive resin to the surrounding air.

As illustrates in FIG. 5, the moisture purge mechanism includes an air/gas plenum or tube 34 that blows a moisture-free gas G onto the chopped fiber web or mesh. The air/gas plenum or tube 34 is positioned atop the lower belt 31 and atop the chopped fiber web or mesh. The air/gas plenum or tube 34 may be positioned directly adjacent the resin application mechanism 33 as illustrated in FIG. 5 so that the moisture-free gas G is blown directly onto the chopped fiber web or mesh as the chopped fiber web or mesh is coated with the reactive resin R, and/or lightweight filler material, from the resin application mechanism 33. In a specific embodiment, the air/gas plenum or tube 34 blows dry nitrogen onto the chopped fiber web or mesh. The air/gas plenum or tube 34 ensures that the area or vicinity around or adjacent the coated chopped fiber web or mesh and/or in the vicinity of the curing oven's inlet is kept substantially free of moisture.

After the chopped fiber web or mesh is coated with the reactive resin R, lightweight filler material, and/or the purge gas G is applied to the coated chopped fiber web or mesh, the coated chopped fiber web or mesh is then subjected to a press mechanism that facilitates in a complete wet-out of the chopped fibers by the reactive resin. The press mechanism function is typically performed by the upper belt 32 and the lower belt 31, which form a double belt compression mechanism. As illustrated in FIG. 5, a distal end of the upper belt 32 may be positioned proximally of the curing oven's inlet by a distance $L_2$, which distance may ensure sufficient room for the distal end of the resin application mechanism 33 and air/gas plenum or tube 34 to be positioned within the curing oven 30 between the upper belt 32 and curing oven inlet. The distance $L_2$ may be between 0.2 and 2.0 feet and more commonly between 0.5 and 1.0 feet. The upper belt 32 and lower belt 31 compress the coated chopped fiber web or mesh as the fiber web or mesh is passed through the curing oven 30. The compression of the coated chopped fiber web or mesh facilitates in the reactive resin (e.g., monomers and/or oligomers) fully saturating the chopped fiber web or mesh. Fully saturating the chopped fiber web or mesh means that the reactive resin completely impregnates individual chopped fiber strands of the web or mesh. The compression of the coated chopped fiber web or mesh between the upper belt 32 and lower belt 31 also minimizes exposure of the coated chopped fiber web or mesh to ambient moisture in the surrounding environment. In some embodiments, the pressing function may be achieved by one or more calendars or rollers that press or squeeze the reactive resin through the chopped fiber web or mesh.

The lower and upper belts, 31 and 32, pass the coated chopped fiber web or mesh through the curing oven 30. The temperature of the curing oven 30 is maintained at a temperature that ensures complete polymerization of the reactive resin. Stated differently, the curing oven 30 is maintained at a polymerization temperature at which the monomers and/or oligomers start to polymerize, which is typically about 100° C. or more. For a reactive resin composition that includes caprolactam, the polymerization temperature may be about 120° C. or more (e.g., about 120° C. to about 220°). For prepreg manufacturing processes where the polymerized resin matrix is not melted, an upper limit on the polymerization temperature for the monomers and/or oligomers may be the melting temperature of the polymer. For example, a reactive resin composition that includes caprolactam may have a upper limit of a polymerization temperature that is the melting temperature of the polyamide-6 (i.e., ~220° C.). The coated chopped fiber web or mesh may be exposed to the curing oven 30 for a time which is sufficient to ensure complete polymerization of the reactive resin material. For example, for a reactive resin composition that includes caprolactam, the residence time of the coated chopped fiber web or mesh in the curing oven may be about 3 minutes to ensure the complete polymerization of caprolactam. Upon polymerization of the reactive resin, the chopped fiber web or mesh is fully impregnated with the thermoplastic polymer. As used herein, the description of the chopped fiber web or mesh being fully impregnated with the thermoplastic polymer means that the thermoplastic polymer impregnates the chopped fiber web or mesh to a degree such that the chopped fiber web or mesh has a void content of the composites of less than 3% in volume based on the total volume of the thermoplastic prepreg. In some embodiments, the chopped fiber web or mesh may have a void content of the composites of less than 1% in volume based on the total volume of the thermoplastic prepreg. Void content of the resulting prepregs can be measured according to the test method ASTM D2734-16.

In some instances the system may be configured to ensure that the viscosity of the reactive resin R remains low before the chopped fiber web or mesh is fully impregnated with the reactive resin. Specifically, the polymerization of the reactive resin R may be controlled to ensure that the chopped fiber web or mesh is fully saturated with the resin before the resin polymerizes.

In some embodiments, a distal end of the oven or enclosure 30 includes a cooling mechanism 35 that is configured to cool a fully cured chopped fiber thermoplastic prepreg 36. The cooling mechanism 35 may cool the chopped fiber thermoplastic prepreg 36 in order to allow the chopped fiber thermoplastic prepreg 36 to be cut to shape, to be handled by an individual, to reduce or prevent warpage of the chopped fiber thermoplastic prepreg 36, or for any other reason. The cooling mechanism 35 typically cools the chopped fiber thermoplastic prepreg 36 to below 50° C. and more commonly to at or near ambient temperature, which allows the chopped fiber thermoplastic prepreg 36 to be handled by an individual without burning or harming the individual. The cooling mechanism 35 may include chilled water cooling.

Upon exiting the curing oven 30, a fully cured chopped fiber thermoplastic prepreg 36 is formed or produced. The system may include a cutting mechanism 38 that is configured to cut the fully cured chopped fiber thermoplastic prepreg into sheets, which may be stacked atop one another. In other embodiments, the system may include a winding mechanism that is configured to wind the fully cured chopped fiber thermoplastic prepreg into a roll product. The system of FIG. 5 is designed so that the process is performed in a time of 20 minutes or less, and more commonly 10 minutes or less. In some embodiments, the process may be performed in 5 minutes or less. The speed and efficiency of the system is not drastically affected when multiple layers of fiber material are employed, such as in the systems of FIGS. 6-8. Rather, the low viscosity reactive resin is able to easily penetrate through and saturate the multiple layers of fiber material so that the overall processing time remains low and relatively unaffected. Full impregnation of the stacked layers is also achievable due to the low viscosity of the resin materials.

Although the lower belt 31 is illustrated as extending from the inlet of the curing oven 30, in some embodiments the lower belt 31 may be fully enclosed within the curing oven 30, or within a hood or cover of the curing oven. In such embodiments, the lower belt 31 extends beyond the distal or front edge of the upper belt 32 so that the other components of the system (i.e., the fiber chopper 27, filler material application mechanism 60, fiber scattering unit 37, drying mechanism 28, resin application mechanism 33, etc.) are able to remain positioned above the lower belt 31. In such an embodiment, the other components of the system are typically enclosed within curing oven 30, or within a hood or cover of the curing oven 30.

Figure 6:
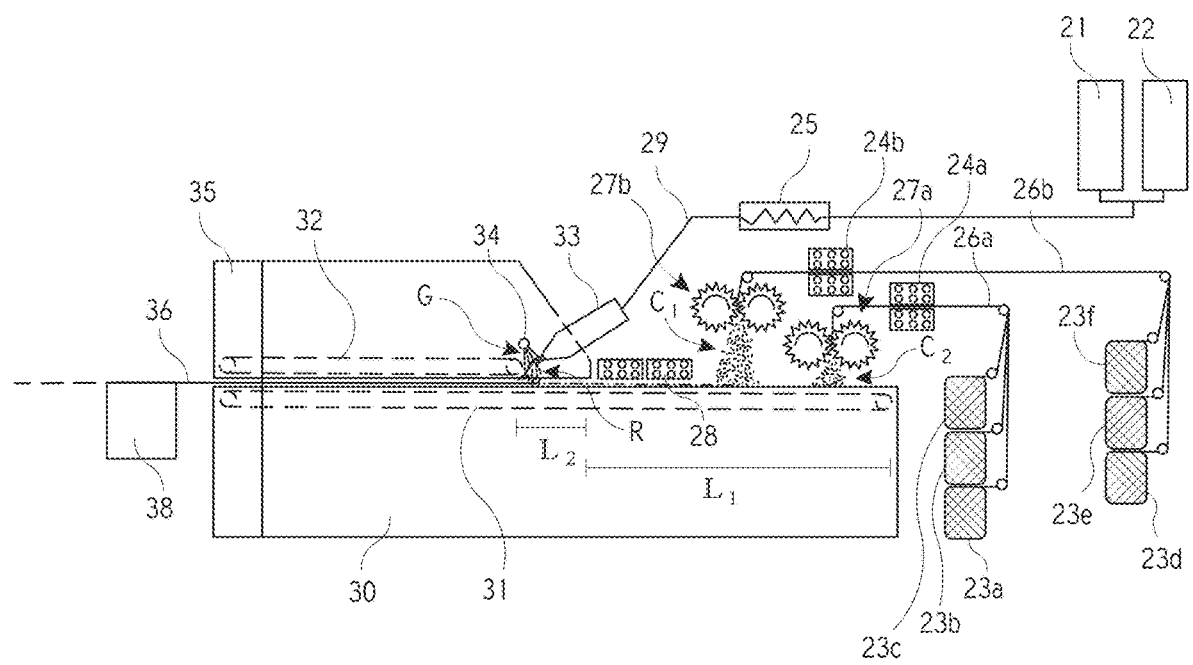

FIG. 6 illustrates a similar system except that the system includes multiple fiber choppers. Specifically, the system includes a first fiber chopper 27a and a second fiber chopper 27b that are each positioned atop the lower belt 31 and configured to cut fiber strands or rovings. The first fiber chopper 27a cuts first fiber strands or rovings 26a that are unwound from the respective spools, 23a-c. The chopped first fiber strands or rovings 26a fall atop the lower belt 31 and form a first layer of a chopped fiber web or mesh. The first strands or rovings 26a may pass through a first roving heater 24a that dries the first strands or rovings 26a. The thickness and/or density of the first layer is controlled by the speed of the first fiber chopped 27a, the number and sizes of individual rovings in 26a, and the speed of the lower belt 31. The second fiber chopper 27b cuts second fiber strands or rovings 26b that are unwound from the respective spools, 23d-f. The chopped second fiber strands or rovings 26b fall atop the lower belt 31 and/or the first layer and form a second layer of the chopped fiber web or mesh. The second strands or rovings 26b may pass through a second roving heater 24b that dries the second strands or rovings 26b. The thickness and/or density of the second layer is controlled by the speed of the second fiber chopped 27b, the number and sizes of individual rovings in 26b, and the speed of the lower belt 31.

The resulting chopped fiber web or mesh may have a layered configuration in which at least one property of the first layer is different than a property of the second layer. The properties may differ in fiber type, fiber length, fiber diameter, fiber or layer density, layer thickness, and the like. In some embodiments, the first and second strands or rovings, 26a and 26b, may be different fiber types, different fiber sizes, and/or have different fiber characteristics. In other embodiments, the chopped fibers that are produced by the first fiber chopper 27a and the second fiber chopper 27b may fall atop the lower belt 31 so that a hybrid layer is formed of the chopped fibers. The hybrid layer may include a mixture of the chopped fibers from the first and second fiber choppers, 27a and 27b. The multiple fiber choppers may be used simply to cut strands or rovings that have different properties. The layered or hybrid chopped fiber web or mesh may then be subjected to the other processes of the system, such as the drying mechanism 28, resin application mechanism 33, gas purge mechanism 34, double belt compression mechanism, curing oven 30, and the like. The resin application mechanism 33 may apply a reactive resin R and/or a lightweight filler material to the layered or hybrid chopped fiber web or mesh. In some embodiments, the first and second roving heaters, 24a and 24b, may be the same heater. The system may also include additional fiber choppers (not shown) that cut additional fiber strands or rovings to form additional layers of the chopped fiber web or mesh as desired.

Figure 7:
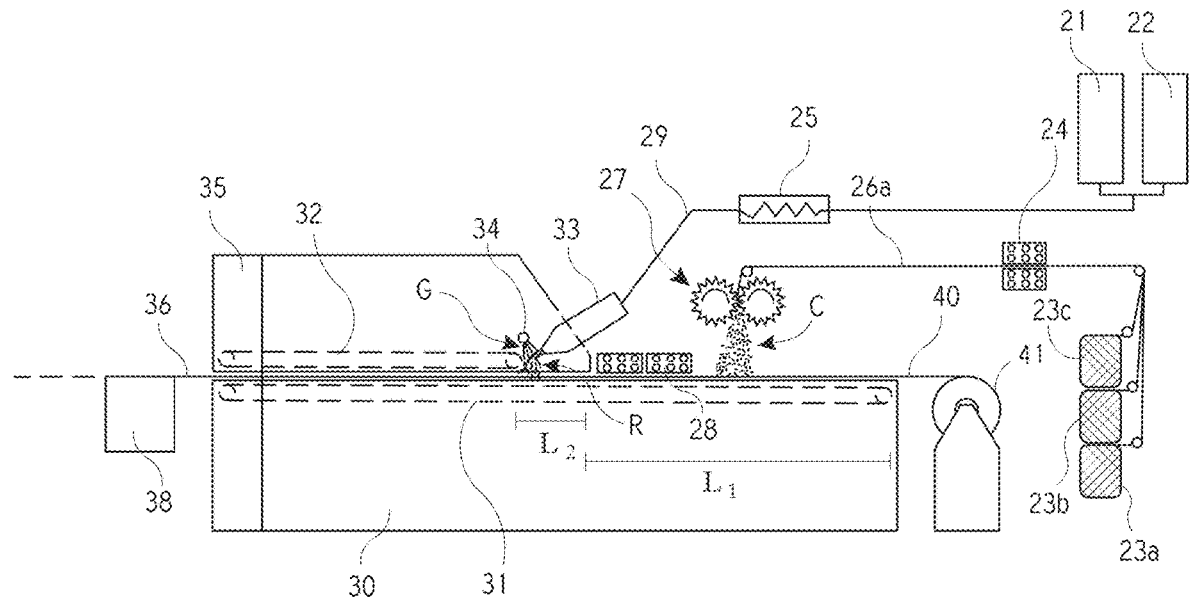

FIG. 7 illustrates a hybrid system in which the thermoplastic prepreg is formed of both the chopped fiber web or mesh and a woven/nonwoven fiber mat, web, or fabric. The system includes an unwinder 41 about which a fiber mat, web, or fabric 40 is positioned. The system is configured to unwind the fiber mat, web, or fabric 40 from the unwinder and to move the fiber mat, web, or fabric 40 atop the lower belt 31. The fiber chopper 27 is positioned above the lower belt 31 and the fiber mat, web, or fabric 40 so that the chopped fibers C fall atop the fiber mat, web, or fabric 40 and typically form a chopped fiber web or mesh layer atop the fiber mat, web, or fabric 40. The thickness of the chopped fiber web or mesh may be controlled by controlling a speed of the fiber chopped 27, and/or a speed of the lower belt 31.

In some embodiments the chopped fibers C may fall within the fiber mat, web, or fabric 40 to form a hybrid layer that consists of the fiber mat, web, or fabric 40 and the chopped fiber web or mesh. In such embodiments, the fiber mat, web, or fabric 40 must be porous enough to enable the chopped fibers C to fall within and through the fiber mat, web, or fabric 40. The fibers or strands 26 may be cut in sufficient small pieces to facilitate dispersion of the chopped fibers C within the fiber mat, web, or fabric 40.

The resulting layered or hybrid mat is then moved past the drying mechanism 28 to remove residual moisture from the layered or hybrid mat. The layered or hybrid mat is then moved past the resin application mechanism 33 so that the reactive resin R, and in some embodiments the lightweight filler material, is applied to the mat and is moved past the gas purge mechanism 34 so that the moisture free gas G is applied to the layered or hybrid mat. The layered or hybrid mat is then moved through the double belt mechanism to fully saturate the layered or hybrid mat and moved through the curing oven 30 to polymerize the reactive resin. Upon polymerization of the reactive resin, the thermoplastic polymer fully impregnates the layered or hybrid mat.

The layered or hybrid mat may provide several advantages over thermoplastic prepregs that employ only a woven/nonwoven fiber mat, web, or fabric. In particular, the layered or hybrid mat may have improved conformability. The improved conformability of the thermoplastic prepreg allows the prepreg to more easily conform to molds having complex shapes. Thus, it is easier to form the prepreg into complex shapes. The use of the fiber mat, web, or fabric typically provides improved strength over prepregs that merely employ chopped fiber webs or meshes.

Figure 8:
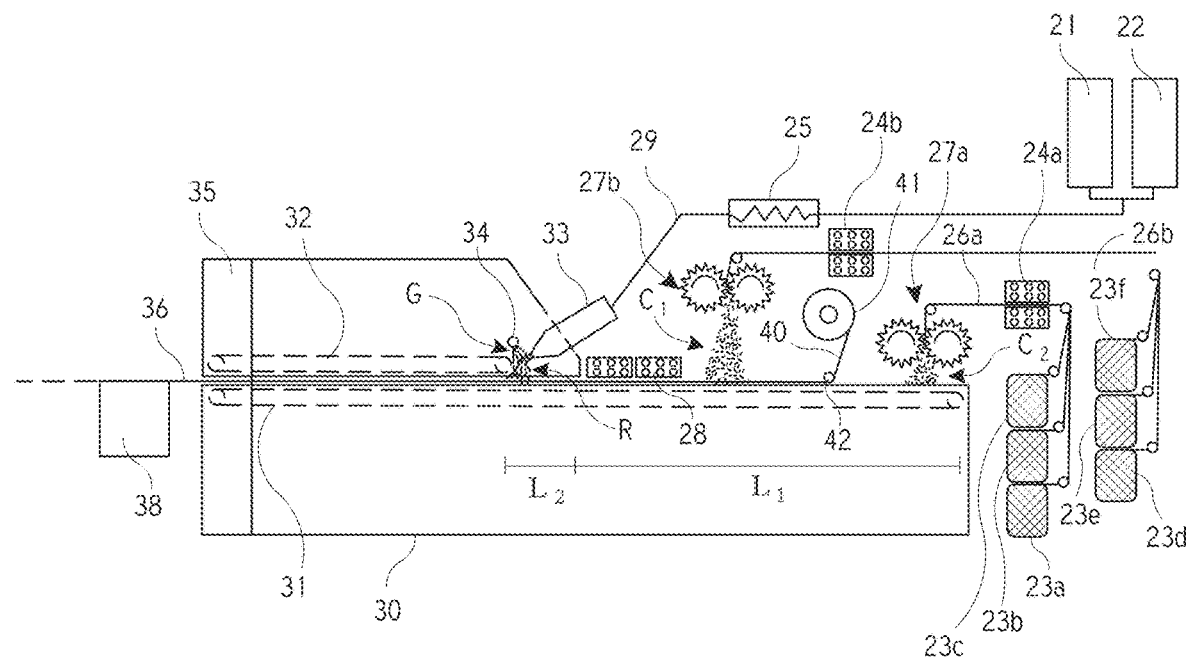

FIG. 8 illustrates another hybrid system in which multiple fiber choppers and a single fiber mat, web, or fabric is employed. It should be realized that the configuration of the system of FIG. 8 may be reversed so that multiple fabrics or mats and a single fiber chopper is employed. Alternatively, the system of FIG. 8 may use both multiple fabrics or mats and multiple fiber choppers if desired to form a thermoplastic prepreg having a desired chopped fiber web or mesh and fiber mat, web, or fabric configuration.

In FIG. 8, a first fiber chopper 27a is positioned atop a distal end of the lower belt 31. The first fiber chopper 27a cuts first fiber strands or rovings 26a that are unwound from about respective spools, 23a-c. The chopped first fiber strands or rovings 26a fall atop the lower belt 31 and form a first layer of a chopped fiber web or mesh. The first strands or rovings 26a may pass through a first roving heater 24a that dries the first strands or rovings 26a. The thickness and/or density of the first layer is controlled by the speed of the first fiber chopped 27a the number and sizes of individual rovings in 26a, and the speed of the lower belt 31. The system also includes an unwinder 41 about which a fiber mat, web, or fabric 40 is positioned. The fiber mat, web, or fabric 40 is unwound from the unwinder 41 and is moved atop the chopped fiber web or mesh formed by the first chopped fiber strands or rovings 26a. A roller 42 may be positioned above the lower belt 31 to properly direct the fiber mat, web, or fabric 40 onto and atop the chopped fiber web or mesh. A second fiber chopper 27b is positioned proximally of the fiber mat, web, or fabric roller 41 and is configured to cuts second fiber strands or rovings 26b that are unwound from about respective spools, 23d-f. The chopped second fiber strands or rovings 26b fall atop the fiber mat, web, or fabric 40 and form a second layer of the chopped fiber web or mesh atop the fiber mat, web, or fabric 40. The second strands or rovings 26b may pass through a second roving heater 24b that dries the second strands or rovings 26b. The thickness and/or density of the second layer is controlled by the speed of the second fiber chopped 27b, the number and sizes of individual rovings in 26b, and the speed of the lower belt 31. The fiber mat, web, or fabric 40 is thus sandwiched between two layers of chopped fiber webs or meshes. The fiber mat, web, or fabric and chopped fiber webs or meshes are then moved through the system to remove residual moisture, apply the reactive resin, and polymerize the reactive resin. The resulting hybrid thermoplastic prepreg 36 may then be rolled about a roller or beam 38 to form a roll product as described herein.

Figure 8A:
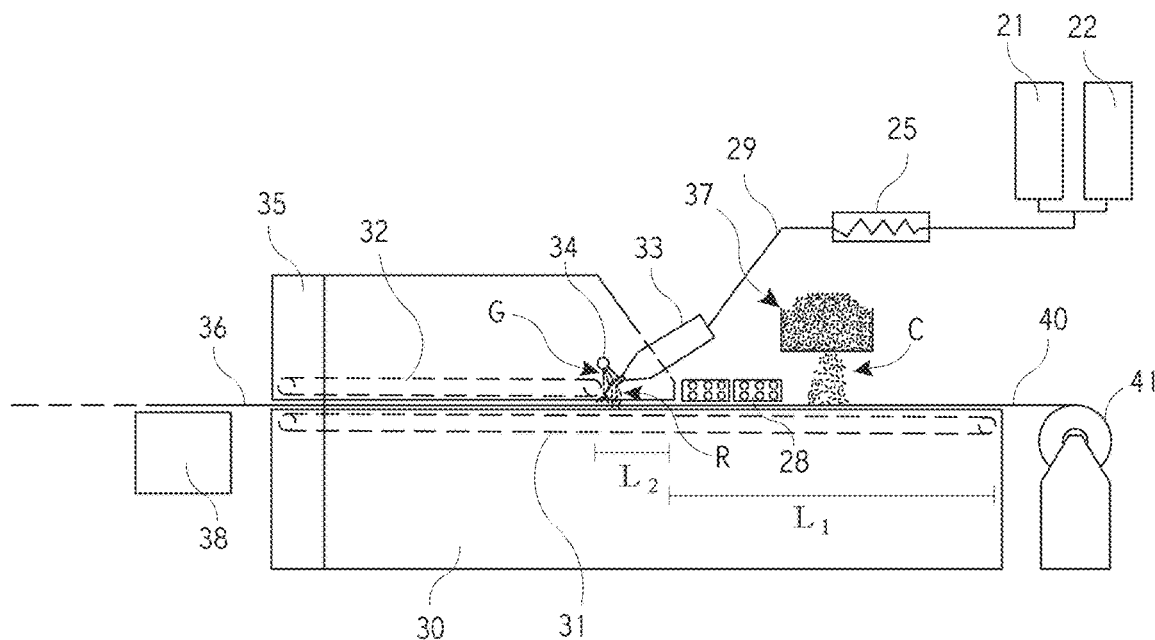
FIG. 8A illustrates a system in which a fiber chopper is replaced with a fiber scattering unit.

FIG. 8A illustrates a hybrid system in which the fiber chopper is replaced with a fiber scattering unit 37. The fiber scattering unit 37 is configured to scatter or disperse pre-cut chopped fiber segments C that are loaded or positioned within a hopper. In some embodiments, the chopped fiber segments C are scattered uniformly atop the lower belt 31 to form a chopped fiber web or mesh. In such embodiments, the system of FIG. 8A does not include the fiber mat, web, or fabric roller 41 and fiber mat, web, or fabric 40. In other embodiments, the chopped fiber segments C are uniformly scattered atop a fiber mat, web, or fabric 40 to form a layer of the chopped fiber web or mesh atop the fiber mat, web, or fabric 40. The system of FIG. 8A may include an additional fiber scattering unit 37 and/or fiber chopper to form additional fiber web or mesh layers and/or to disperse different fiber sizes or types within the fiber web or mesh. The chopped fibers C may be fully dried prior to scattering or dispersing them atop the lower belt 31 or fiber mat, web, or fabric 40. The system may include the various other components described herein, or may exclude one or more of those components as desired. In some embodiments, the lightweight filler material may be combined with chopped fibers in the hopper. In such embodiments, the fiber scatter unit 37 may be configured to disperse or scatter both the chopped fibers and lightweight filler material atop the lower belt 31 or fiber mat, web, or fabric 40. The chopped fibers and lightweight filler material may be dispersed uniformly atop the lower belt 31 or fiber mat, web, or fabric 40.

Figure 8B:
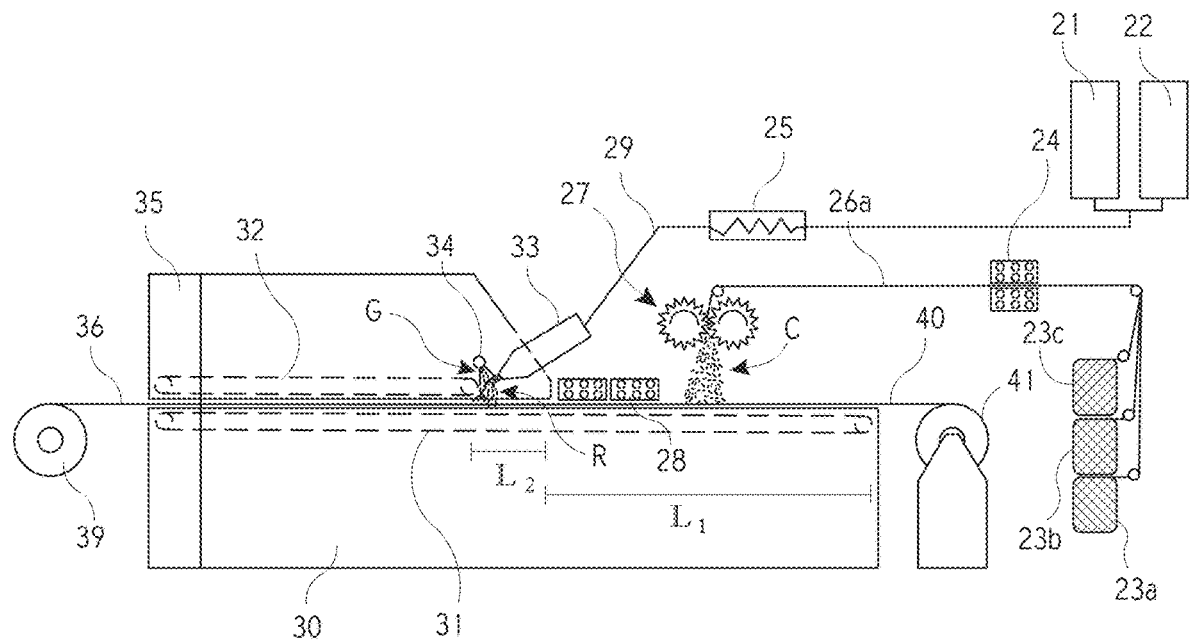
FIG. 8B illustrates a system that includes a winding mechanism that winds a fully cured chopped fiber thermoplastic prepreg into a roll product.

FIG. 8B illustrates a hybrid system in which the fully cured chopped fiber thermoplastic prepreg 36 is wound into a roll product via a winding mechanism 39. The thermoplastic prepreg may be formed solely of a chopped fiber web or mesh or may be formed of both the chopped fiber web or mesh and a woven/nonwoven fiber mat, web, or fabric. When the thermoplastic prepreg is formed of the chopped fiber web or mesh and woven/nonwoven fiber mat, web, or fabric, the system includes an unwinder 41 about which a fiber mat, web, or fabric 40 is positioned as previously described. The system of FIG. 8B may include one or more fiber choppers C and/or rollers 41 to form any type of layered prepreg that is desired.

Figure 9:
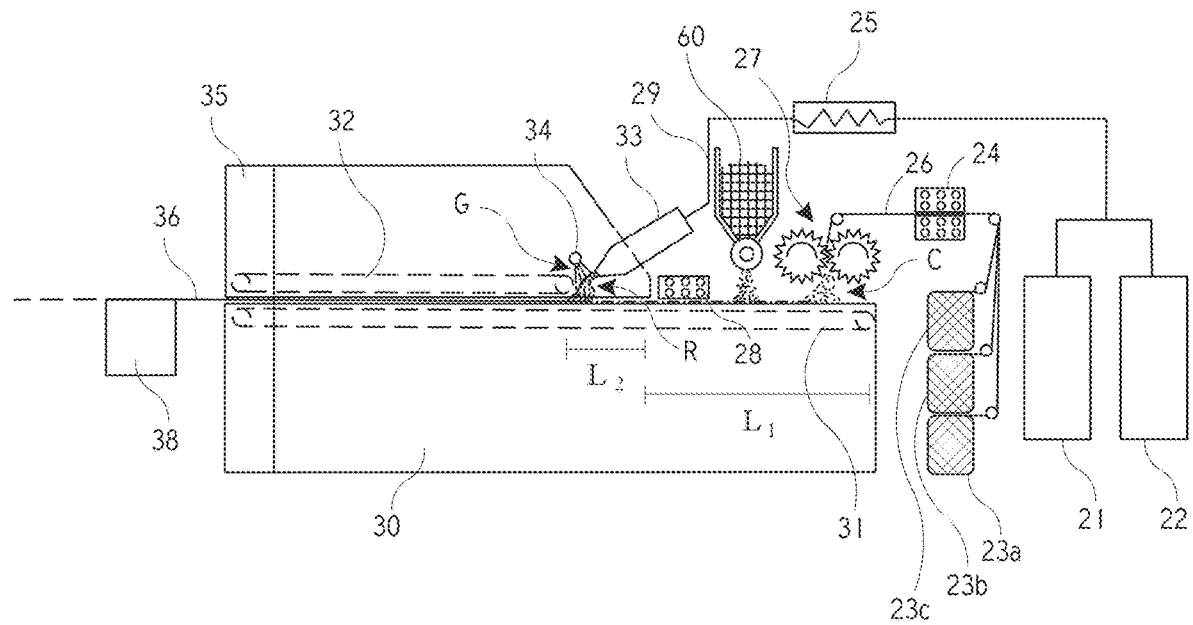
FIGS. 9-11 illustrate systems that may be used to produce lighter weight prepregs that are fully impregnated with a thermoplastic polymer.

FIG. 9 illustrates a system that includes a filler material application mechanism 60 that is positioned atop the lower belt 31 and typically before the drying mechanism 28. The filler material application mechanism 60 is configured to apply a light weight filler material to a web or mesh of chopped fibers that are supplied via a fiber chopper 27 or a fiber scattering unit 37. In some embodiments, the filler material application mechanism 60 may be positioned immediately adjacent to the fiber chopper 27 and/or fiber scattering mechanism 37 so that the lightweight filler material is added atop the lower belt 31 nearly simultaneously with the chopped fibers. In such embodiments, the lightweight filler material may be essentially homogenously dispersed within the chopped fiber web or mesh. In other embodiments, the filler material application mechanism 60 may be positioned downstream of the fiber chopper 27 and/or fiber scattering mechanism 37 so that the lightweight filler material is added atop the chopped fiber web or mesh to form a layer of the lightweight filler material atop the chopped fiber web or mesh. The filler material application mechanism 60 may be a powder applicator or device that is configured to apply light weight filler material (e.g., hollow glass microspheres) to the fiber web or mesh. The filler material application mechanism 60 may be adjustable to vary a speed with which the light weight filler material is applied. The application speed of the lightweight filler material may be varied to change the thickness of the lightweight filler material layer and/or to accommodate the speed of the lower belt 31 and/or fiber chopper 27 or fiber scattering unit 37. In some embodiments, the lightweight filler material (e.g., hollow glass microspheres) includes a sizing composition having a coupling agent that promotes bonding between the lightweight filler material and the thermoplastic polymer material.

The system of FIG. 9 may include an additional fiber chopper 27, fiber scattering unit 37, and/or filler material application mechanism 60 to form additional lightweight filler material and/or fiber web or mesh layers as desired. The drying mechanism 28 may be configured to remove residual moisture from the chopped fiber web or mesh and the lightweight filler material as these materials or layers are moved past the drying mechanism. In other embodiments, the lightweight filler material may be dried via a separate drying mechanism (not shown) prior to being applied atop or with the chopped fiber web or mesh. In such embodiments, the drying mechanism 28 may be employed mainly to dry the chopped fiber web or mesh.

In some embodiments, additional lightweight filler materials may be provided via the fiber scattering unit 37 and/or resin application mechanism 33 as described herein to form a thermoplastic prepreg with a high filler content. The chopped fiber web or mesh and filler material may be subjected to the other processes of the system, such as the gas purge mechanism 34, double belt compression mechanism, curing oven 30, cutting mechanism 38, roll mechanism 39, and the like.

Figure 10:
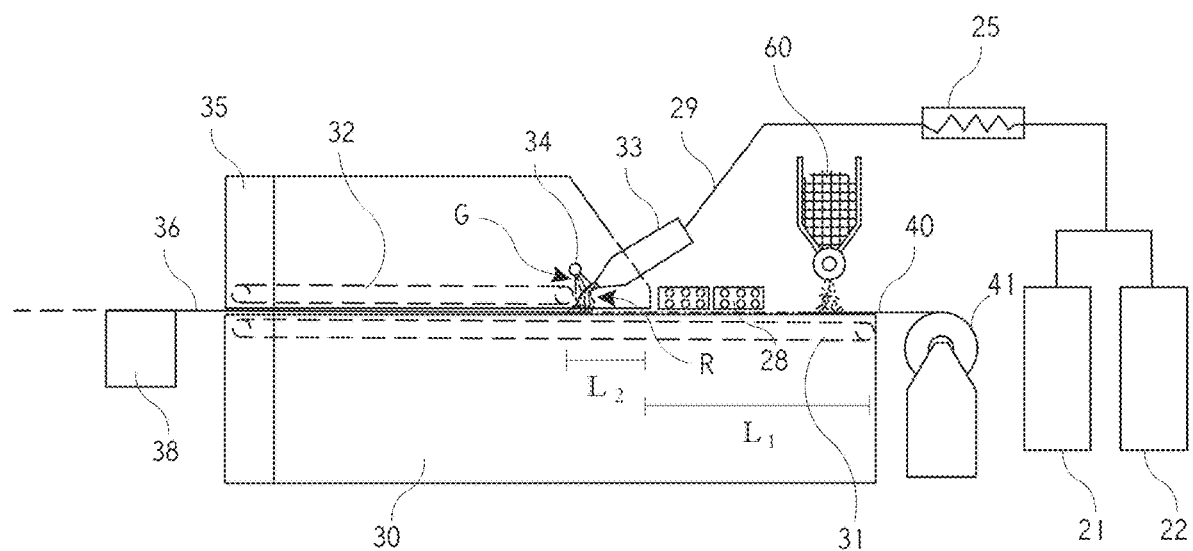

FIG. 10 illustrates a system that includes a filler material application mechanism 60 that is positioned atop the lower belt 31 and that is configured to apply a light weight filler material to a fiber mat, web, or fabric 40 that is unrolled from an unwinder 41. The filler material application mechanism 60 typically adds the lightweight filler material atop the fiber mat, web, or fabric 40 so that a layer of the lightweight filler material is formed atop the fiber mat, web, or fabric 40. In some embodiments, the lightweight filler material may penetrate into the fiber mat, web, or fabric 40, such as when the fiber mat, web, or fabric 40 has a relatively loose fiber weave or loose fiber nonwoven configuration. In such embodiments, the lightweight filler material is disposed at least partially within the fiber mat, web, or fabric 40. A degree of penetration of the lightweight filler material into the fiber mat, web, or fabric 40 can be controlled by controlling the tightness of the fiber weave or a porosity of the nonwoven fiber mat. In some embodiments, the lightweight filler material may penetrate through the fiber mat, web, or fabric 40. As previously described, the filler material application mechanism 60 may be a powder applicator or device that is configured to apply lightweight filler material (e.g., hollow glass microspheres) to the fiber mat, web, or fabric. In some embodiments, the lightweight filler material (e.g., hollow glass microspheres) includes a sizing composition having a coupling agent that promotes bonding between the lightweight filler material and the thermoplastic polymer material.

The drying mechanism 28 may be configured to remove residual moisture from the fiber mat, web, or fabric 40 and the lightweight filler material as these materials or layers are moved past the drying mechanism. In other embodiments, the lightweight filler material may be dried via a separate drying mechanism (not shown) prior to being applied atop the fiber mat, web, or fabric 40. In such embodiments, the drying mechanism 28 may be employed mainly to dry the fiber mat, web, or fabric 40. In some embodiments, additional lightweight filler materials may be provided via the resin application mechanism 33 as described herein to form a thermoplastic prepreg with a high filler content. The fiber mat, web, or fabric 40 and filler material may be subjected to the other processes of the system, such as the gas purge mechanism 34, double belt compression mechanism, curing oven 30, cutting mechanism 38, roll mechanism 39, and the like.

Figure 11:
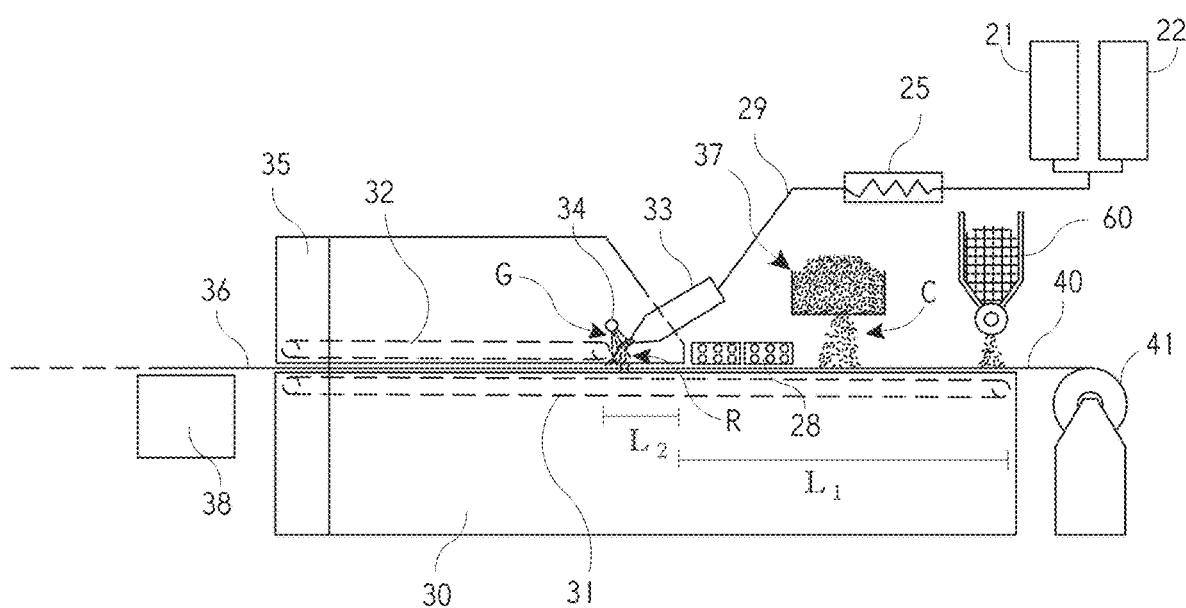

FIG. 11 illustrates a system that includes a filler material application mechanism 60 that is positioned atop the lower belt 31 and that is configured to apply a light weight filler material to a fiber mat, web, or fabric 40 and a chopped fiber web or mesh. The system includes an unwinder 41 that provides the fiber mat, web, or fabric 40 and includes a fiber chopper 27 and/or a fiber scattering unit 37 that provides chopped fibers C. FIG. 11 illustrates the filler material application mechanism 60 being positioned between the unwinder 41 and the fabric chopper 27/fiber scattering unit 37. It should be realized, however, that the filler material application mechanism 60 may be positioned elsewhere as desired, such as after both the unwinder 41 and the fabric chopper 27/fiber scattering unit 37. Additionally, the position of the unwinder 41 and the fabric chopper 27/fiber scattering unit 37 may be switched in the system of FIG. 11 as desired. It should also be realized that the system may include additional unwinders 41, filler material application mechanisms 60, and/or fabric choppers 27/fiber scattering units 37 as desired to form a thermoplastic prepreg having any desired configuration.

The lightweight filler material may penetrate into the fiber mat, web, or fabric 40 and/or chopped fiber web or mesh so that the lightweight filler material is disposed at least partially within the fiber mat, web, or fabric 40 and/or chopped fiber web or mesh. A degree of penetration of the lightweight filler material into the fiber mat, web, or fabric 40 and/or chopped fiber web or mesh can be controlled by controlling the tightness of the fiber weave, a porosity of a nonwoven fiber mat, or a looseness of the chopped fibers. The lightweight filler material more commonly forms a layer that is positioned between the fiber mat, web, or fabric 40 and chopped fiber web or mesh or atop both the fiber mat, web, or fabric 40 and the chopped fiber web or mesh.

The drying mechanism 28 may be configured to remove residual moisture from the fiber mat, web, or fabric 40, the chopped fiber web or mesh, and the lightweight filler material as these materials or layers are moved past the drying mechanism. In some embodiments, the lightweight filler material may be dried via a separate drying mechanism (not shown) prior to being applied atop the fiber mat, web, or fabric 40. In such embodiments, the drying mechanism 28 may be employed mainly to dry the chopped fiber web or mesh and/or fiber mat, web, or fabric 40. In some embodiments, additional lightweight filler materials may be provided via the resin application mechanism 33 and/or fiber scattering unit 37 as described herein to form a thermoplastic prepreg with a high filler content. The fiber mat, web, or fabric 40 and filler material may be subjected to the other processes of the system, such as the gas purge mechanism 34, double belt compression mechanism, curing oven 30, cutting mechanism 38, roll mechanism 39, and the like.

Exemplary Prepregs

The above system may be used to manufacture a fully impregnated thermoplastic prepreg. The thermoplastic prepreg may include a fiber mat, web, or fabric, a chopped fiber web or mesh, or a hybrid web or mat. In one embodiment, the fiber mat, web, or fabric may include a plurality of rovings that are woven together. Each roving may contain a bundle of continuous glass fibers or any other fibers. In another embodiment, the fiber mat, web, or fabric may include a plurality of entangled and intermeshed fibers that are randomly oriented. In yet another embodiment, a web or mesh of un-bonded chopped fibers may be employed. The prepreg also includes a thermoplastic polymer that is fully impregnated within the fiber mat, web, or fabric, chopped fiber web or mesh, or hybrid web or mat. The thermoplastic polymer is formed by polymerizing a reactive resin (e.g., caprolactam, CBT, and the like) to form the thermoplastic polymer (e.g., polyamide-6, PBT, and the like). As described herein, greater than 90%, 95%, 98%, or even 99% by weight of the resin reacts to form the thermoplastic polymer. When the fully impregnated thermoplastic prepreg is subjected to a subsequent heating and/or pressure process, the thermoplastic polymer melts or softens to allow the thermoplastic prepreg to be molded or formed into a composite part.

In some embodiments, the fully impregnated thermoplastic prepreg is a rolled product. In some other embodiments, the fully impregnated thermoplastic prepreg may be cut to sheets. The thermoplastic prepreg may be subsequently formed into a composite part. For example, one or more layers of the thermoplastic prepreg may be compression molded into a desired composite part. Exemplary techniques for forming the prepregs into the fiber-reinforced composite articles may include compression molding of a single prepreg layer, multiple prepreg layers, and/or pellets of prepreg material into the fiber-reinforced article. When the prepreg includes partially-polymerized resin, the compression molding process may include a heating step (e.g., hot pressing) to fully polymerize the resin. Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VARTM), spray-up forming processes, filament winding processes, and long-fiber injection molding processes, among others. The prepreg may also be used as local reinforcement or for overmolding during injection and compression molding processes including LFT (long fiber thermoplastic) and D-LFT (direct-long fiber thermoplastic).

Exemplary composite products that may be formed from the prepregs include: automotive components, wind turbine blade components, building and construction components, electrical components, sports and leisure components, and/or other components. Exemplary automotive components include: cockpit, seats, instrument panels, side beams, bottom plate, bottom plate side beam, door trims, body panels, openings, underbody, front/rear modules, engine compartment, engine covers, battery trays, oil pans, bonnets/hoods, fenders, spoilers, and the like.

Exemplary wind turbine blade components include: spar cap, shells, root inserts, and the like. Exemplary building and construction components include: columns, pediments, domes, panels, window profiles, ladder rails, and the like. Exemplary electrical components include: light poles, circuit boards, electrical junction boxes, and the like. Exemplary sports and leisure components include: golf club shafts, golf trolleys, and the like. Other components that may be formed form the prepregs include: components for mass transportation, agricultural equipment, and trailers/RV including passenger seats, standbacks, wall claddings, floor panels, large panels for trailer walls, truck and tractor cabs, bus body shells, cargo containers, and the like.

In a specific embodiment, a battery tray or compartment for an electric car or vehicle may be molded using the fully impregnated thermoplastic prepregs described herein. The battery compartment may be molded from a single piece of the prepreg material, thereby eliminating the need to use unidirectional tape on the corners or edges to reinforce these areas of the battery compartment, as is done in conventional processes.

Figure 12:
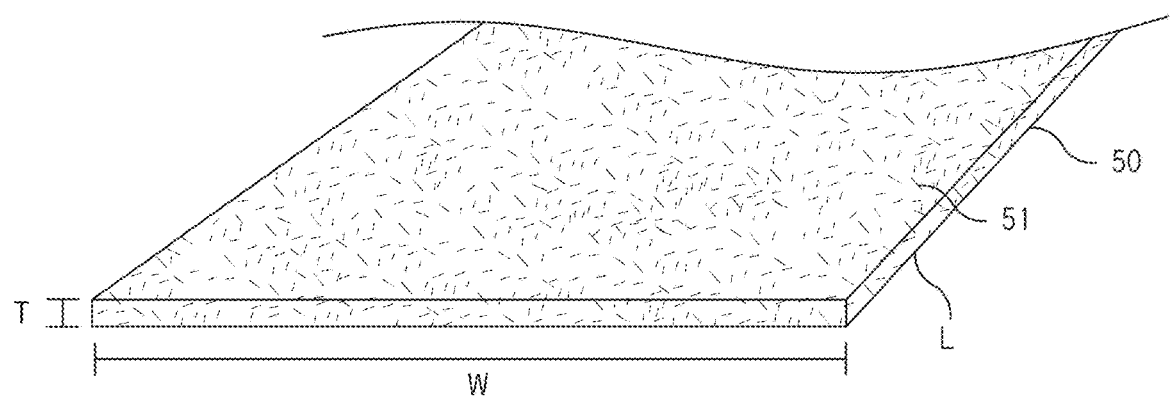
FIGS. 12-19 illustrate exemplary prepregs that are fully impregnated with a thermoplastic polymer.

Referring to FIG. 12, illustrated is a thermoplastic prepreg that may be formed by one of the systems and/or methods described herein. The thermoplastic prepreg includes a web or mesh of fibers 50 that includes a plurality of chopped fibers 51 having a fiber length and a fiber diameter. The fiber length is typically between 10 and 100 mm and more commonly between 25 and 50 mm. The fiber diameter is typically between 1 and 30 µm and more commonly between 5 and 20 µm. As described herein, the web or mesh of fibers 50 is typically un-bonded prior to the application of a reactive resin and thus, the web or mesh of fibers 50 is typically not mechanically bonded and does not include a binder other than the thermoplastic material that binds the chopped fibers together. The web or mesh of fibers 50 is also not typically coupled together via some means other than the thermoplastic material. The web or mesh of fibers 50 may include multiple fiber types and/or fiber sizes as described herein that are homogenously or uniformly dispersed within the web or mesh of fibers 50 and that form a hybrid fiber mesh. The chopped fibers 51 may include a sizing composition that has a coupling agent that promotes bonding between the chopped fibers 51 and the thermoplastic polymer. The chopped fibers may include or consist of glass fibers, carbon fibers, basalt fibers, metal fibers, ceramic fiber, natural fibers, synthetic organic fibers, aramid fibers, inorganic fibers, or combinations thereof. In some instances, it may be beneficial to use a chemically or mechanically coupled web or mesh of fibers 50 and thus, the web or mesh of fibers 50 is not limited to a specific configuration (i.e., bonded or un-bonded) unless specifically recited in the claims.

The thermoplastic material fully impregnates the web or mesh of fibers 50 so that the thermoplastic prepreg has a void content of less than 5% and more commonly less than 3%. In most embodiments, the thermoplastic prepreg has a void content of less than 3% and sometime less than 1%. As described herein, the thermoplastic material comprises or consists of polymers that are formed by in-situ polymerization of monomers or oligomers in which greater than 90%, 95%, 98%, or even 99% by weight of the monomers or oligomers react to form the thermoplastic material. The thermoplastic prepreg includes 5 to 95 weight percent of the thermoplastic material. The thermoplastic material may include or consist of nylon, PMMA, PBT, thermoplastic polyurethane (TPU), or mixtures thereof.

Figure 13:
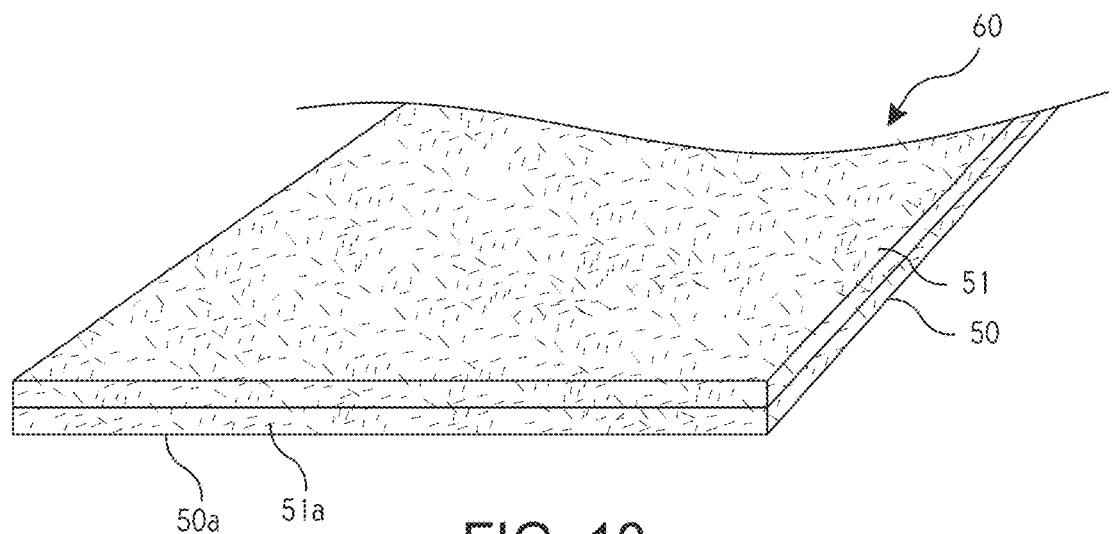

FIG. 13 illustrates another thermoplastic prepreg in which the web or mesh of fibers includes a first layer 50*a* of fibers formed of first chopped fibers 51*a* and a second layer 50*b* of fibers formed of second chopped fibers 51*b*. The first chopped fibers 51*a* and second chopped fibers 51*b* are typically different fiber types and/or fiber sizes. The composition of each fiber layer, the density of each fiber layer, and/or the thickness of each fiber layer may be selected based on a given application for the thermoplastic prepreg and/or based on a desired prepreg property. The first chopped fibers 51*a* and second chopped fibers 51*b* are typically not entangled or intermixed except for at an interface between the first layer 50*a* and the second layer 50*b*. The thermoplastic material fully impregnates the fiber web or mesh. The thermoplastic prepreg may have a void content and polymerization percentage as described herein. The thermoplastic prepreg of FIG. 13 may be formed via the system illustrated in FIG. 6.

Figure 14:
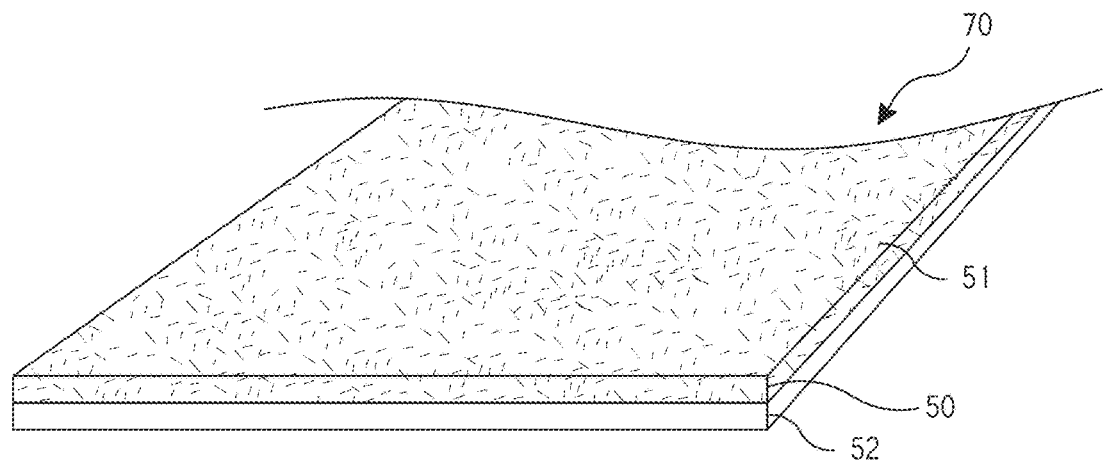

FIG. 14 illustrates a thermoplastic prepreg that has a layered configuration in which each layer includes a different fiber reinforcement. Specifically a first layer of the thermoplastic prepreg includes the web or mesh of chopped fibers 50 and a second layer of the thermoplastic prepreg includes a woven fabric or nonwoven mat 52. As described herein the woven fabric or nonwoven mat 52 is typically formed of continuous fiber strands or a plurality of entangled or bonded fiber segments. The composition of each layer, the density of each layer, and/or the thickness of each layer may be selected based on a given application for the thermoplastic prepreg and/or based on a desired prepreg property. The thermoplastic material fully impregnates the fiber reinforcement. The thermoplastic prepreg may have a void content and polymerization percentage as described herein. The thermoplastic prepreg of FIG. 14 may be formed via the system illustrated in FIG. 7.

Figure 15:
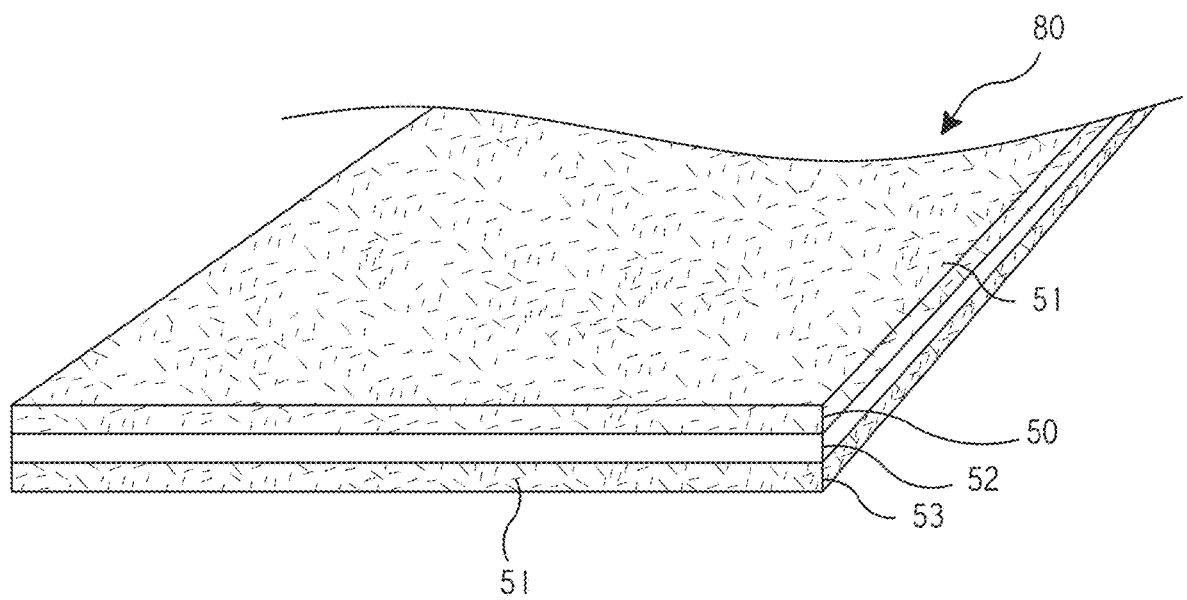

FIG. 15 illustrates a thermoplastic prepreg that has a layered configuration in which the woven fabric or nonwoven mat 52 is sandwiched between an upper layer of the web or mesh of chopped fibers 50 and a lower layer of a web or mesh of chopped fibers 53. The composition of each layer, the density of each layer, and/or the thickness of each layer may be selected based on a given application for the thermoplastic prepreg and/or based on a desired prepreg property. The thermoplastic material fully impregnates the fiber reinforcement. The thermoplastic prepreg may have a void content and polymerization percentage as described herein. The thermoplastic prepreg of FIG. 15 may be formed via the system illustrated in FIG. 8.

Figure 16:
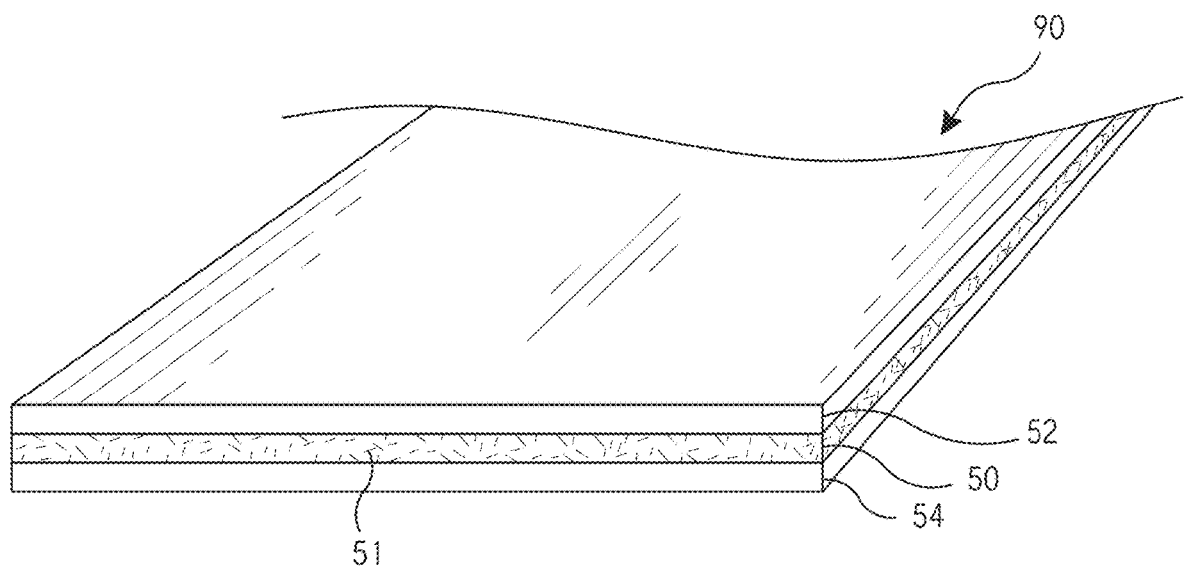

FIG. 16 illustrates a thermoplastic prepreg that also has a layered configuration, but is opposite the configuration of FIG. 15 in that the web or mesh of chopped fibers 50 is sandwiched between an upper layer of the woven fabric or nonwoven mat 52 and a lower layer of a woven fabric or nonwoven mat 54. The composition of each layer, the density of each layer, and/or the thickness of each layer may be selected based on a given application for the thermoplastic prepreg and/or based on a desired prepreg property. The thermoplastic material fully impregnates the fiber reinforcement. The thermoplastic prepreg may have a void content and polymerization percentage as described herein. The thermoplastic prepreg of FIG. 16 may be formed via a system similar to that illustrated in FIG. 8 in which a single fiber chopper is employed and two fabrics or mats are employed. Alternatively, a thermoplastic prepreg(s) formed via the system of FIG. 1A or 1B may be thermoplastically bonded with a thermoplastic prepreg formed via any of the systems of FIGS. 5-7.

Figure 17:
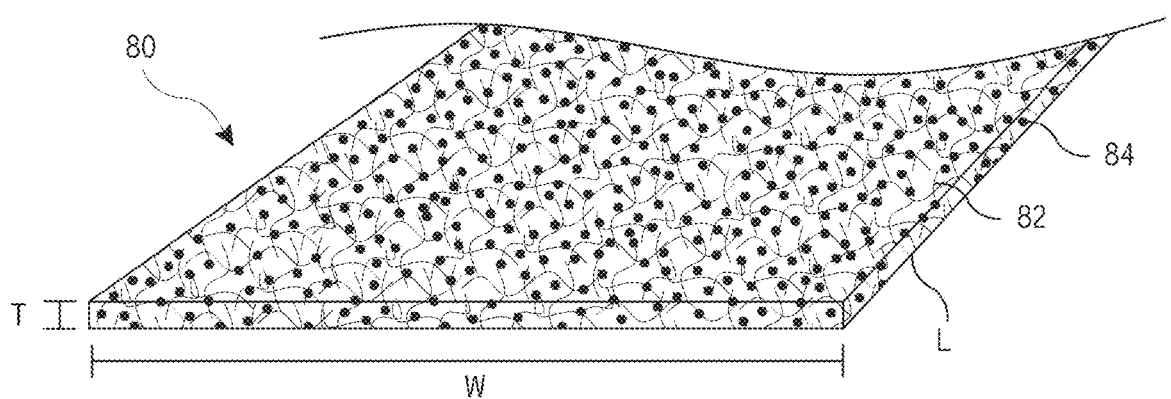

Referring to FIG. 17, illustrated is a lightweight thermoplastic prepreg that may be formed by one of the systems and/or methods described herein, and in particular, the systems of FIGS. 9-11. The thermoplastic prepreg includes a mat or web 80 that includes a plurality of fibers 82 having a fiber length and a fiber diameter. The fibers 82 may be chopped fibers, nonwoven fibers, or continuous fibers that are typically used in woven fabrics so that the mat or web 80 is a woven fabric, a nonwoven mat, a chopped fiber mesh, or any combination thereof. The mat or web 80 also includes a light weight filler material, which in an exemplary embodiment is hollow glass microspheres 84. The lightweight filler material will be referred to in relation to FIGS. 17-19 as hollow glass microspheres 84, although it should be realized that the lightweight material may also be perlite or some other lightweight material. The hollow glass microspheres 84 are homogenously dispersed within the plurality of fibers of the mat or web 80.

A thermoplastic polymer is fully impregnated through the mat or web 80 and the hollow glass microspheres 84. The thermoplastic polymer impregnates the mat or web 80 such that the thermoplastic prepreg is substantially free of gaps or voids. The thermoplastic material is made of polymerized monomers and oligomers in which greater than 90% of the monomers or oligomers react to form the thermoplastic material.

The mat or web 80 may include multiple fiber types and/or fiber sizes as described herein that are homogenously or uniformly dispersed within the mat or web 80. The hollow glass microspheres 84 and/or the fibers 82 of the mat or web 80 may include a sizing composition having a coupling agent that promotes bonding between the hollow glass microspheres or the fibers and the thermoplastic polymer. The fiber 82 may include glass fibers, carbon fibers, basalt fibers, metal fibers, ceramic fiber, natural fibers, synthetic organic fibers, aramid fibers, inorganic fibers, or combinations thereof. The thermoplastic material may include nylon, PBT, PMMA, thermoplastic polyurethane, and combinations thereof. The lightweight thermoplastic prepreg may be formed or cut into sheets or rolled into a roll product as desired.

The thermoplastic material fully impregnates the web or mesh of fibers 50 so that the thermoplastic prepreg has a void content of less than 5% and more commonly less than 3%. In most embodiments, the thermoplastic prepreg has a void content of less than 1%. As described herein, the thermoplastic material comprises or consists of polymers that are formed by in-situ polymerization of monomers or oligomers in which greater than 90%, 95%, 98%, or even 99% of the monomers or oligomers react to form the thermoplastic material. The thermoplastic prepreg includes 5 to 95 weight percent of the thermoplastic material. As described herein, a residual amount of the monomer or oligomers may remain unpolymerized in the lightweight thermoplastic prepreg. The residual monomer or oligomer content can be measured via the solvent extraction method described herein.

Figure 18:
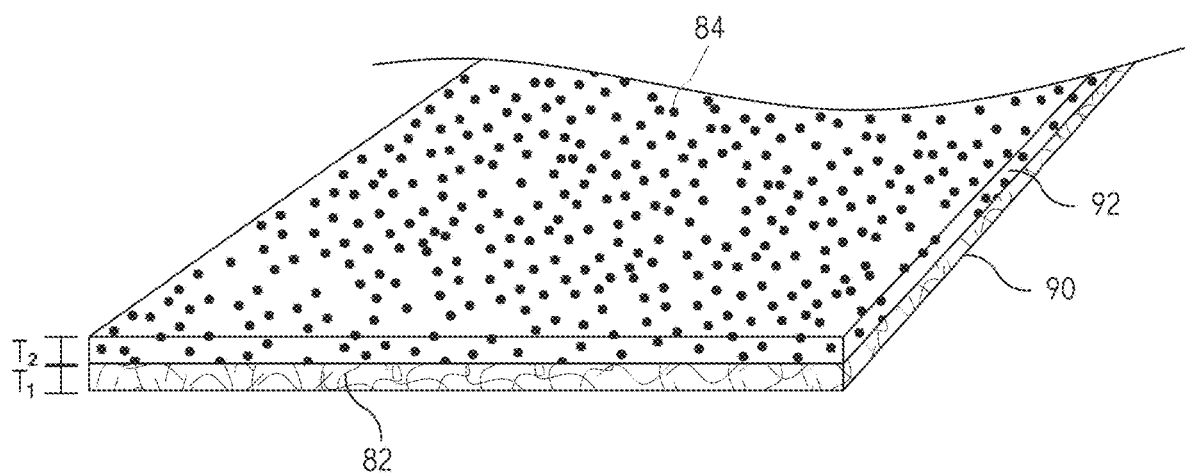

Referring not to FIG. 18, illustrated is a lightweight prepreg having a layered configuration. Specifically, the lightweight prepreg includes a first layer 90 that includes a mat, web, or mesh of fibers 82. The first layer 90 may include any of the fiber configurations or arrangement illustrated in FIGS. 12-16, and in particular is typically a woven fabric, nonwoven mat layer, chopped fiber mesh, or any combination thereof. A second layer 92 is positioned atop the first layer 90. The second layer 92 is a layer of the hollow glass microspheres 84. The second layer 92 typically only includes the hollow glass microspheres 84, although in some embodiments the second layer 92 may include a combination of the hollow glass microspheres 84 and the fibers 82.

Figure 19:
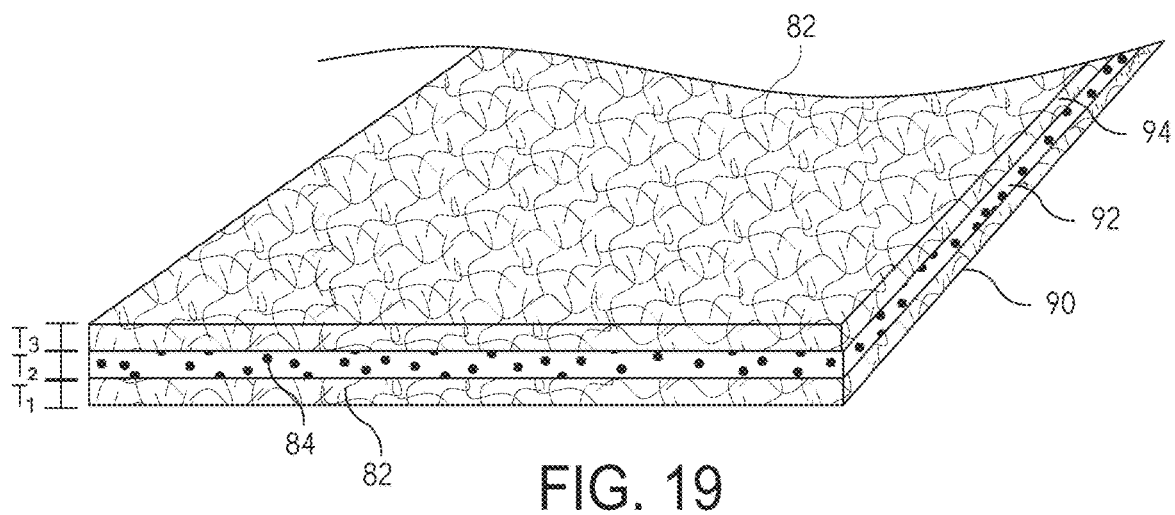

Referring now to FIG. 19, illustrated is another lightweight prepreg having a layered configuration. Specifically, the lightweight prepreg includes a first layer 90 that includes a mat, web, or mesh of fibers and a third layer 94 that also includes a mat, web, or mesh of fibers 82. The first layer 90 and/or third layer 94 may include any of the fiber configurations or arrangement illustrated in FIGS. 12-16, and in particular are typically woven fabrics, nonwoven mat layers, chopped fiber meshes, or any combination thereof. A second layer 92 is positioned between the first layer 90 and the third layer 94. The second layer 92 is a layer of the hollow glass microspheres 84. The second layer 92 typically only includes the hollow glass microspheres 84, although in some embodiments the second layer 92 may include a combination of the hollow glass microspheres 84 and the fibers 82. In some embodiments, the first layer 90 and the third layer 94 may be layers of hollow glass microspheres 84 and the second layer 92 may be a layer of the fibers 82.

In some embodiments, the thermoplastic prepregs described herein may not be fully polymerized. As such, the thermoplastic prepregs may include a residual resin content—e.g., a residual monomer or oligomer content. The residual resin content consists of monomers or oligomers that have not polymerized into the thermoplastic material. For example, the thermoplastic material of a thermoplastic prepreg may include between 0.5 and 5 percent of the residual monomers or oligomers, and more commonly between 1 and 3 percent, or between 1 and 2 percent, of the residual monomers or oligomers. The percentage of residual monomers or oligomers that is present in the thermoplastic material is determined in relation to the amount of resin that was initially added to the fiber reinforcement. For example, a residual monomer or oligomer content of between 0.5 and 5 percent means that 0.5-5 percent of the resin that was added to the fiber reinforcement remains in the unpolymerized state. The content of residual monomer or oligomer in the prepreg can be measured via a solvent extraction method as descried herein below. For example, the amount of residual caprolactam in polyamide-6 prepreg can be measured via the extraction of grounded powder of prepreg using hot water. The thermoplastic material of the thermoplastic prepreg may have a higher molecular weight than conventional thermoplastic prepregs. For example, the thermoplastic prepreg may include a higher molecular weight polyamide-6 material. In such embodiments, the higher molecular weight thermoplastic material may be evidenced by a non-solubility of the polyamide-6 material in a solvent in which conventional hydrolytically polymerized polyamide-6 resin is typically soluble. For example, polyamide-6 resin formed via in situ anionic polymerization of caprolactam may be insoluble in solvents such as hexafluoroisopropanol (HFIP), while the common hydrolytically polymerized polyamide-6 is soluble in HFIP.

The thermoplastic prepregs of FIGS. 12-19 may be roll products or may be cut into individual segments as desired.

Methods

Figure 2:
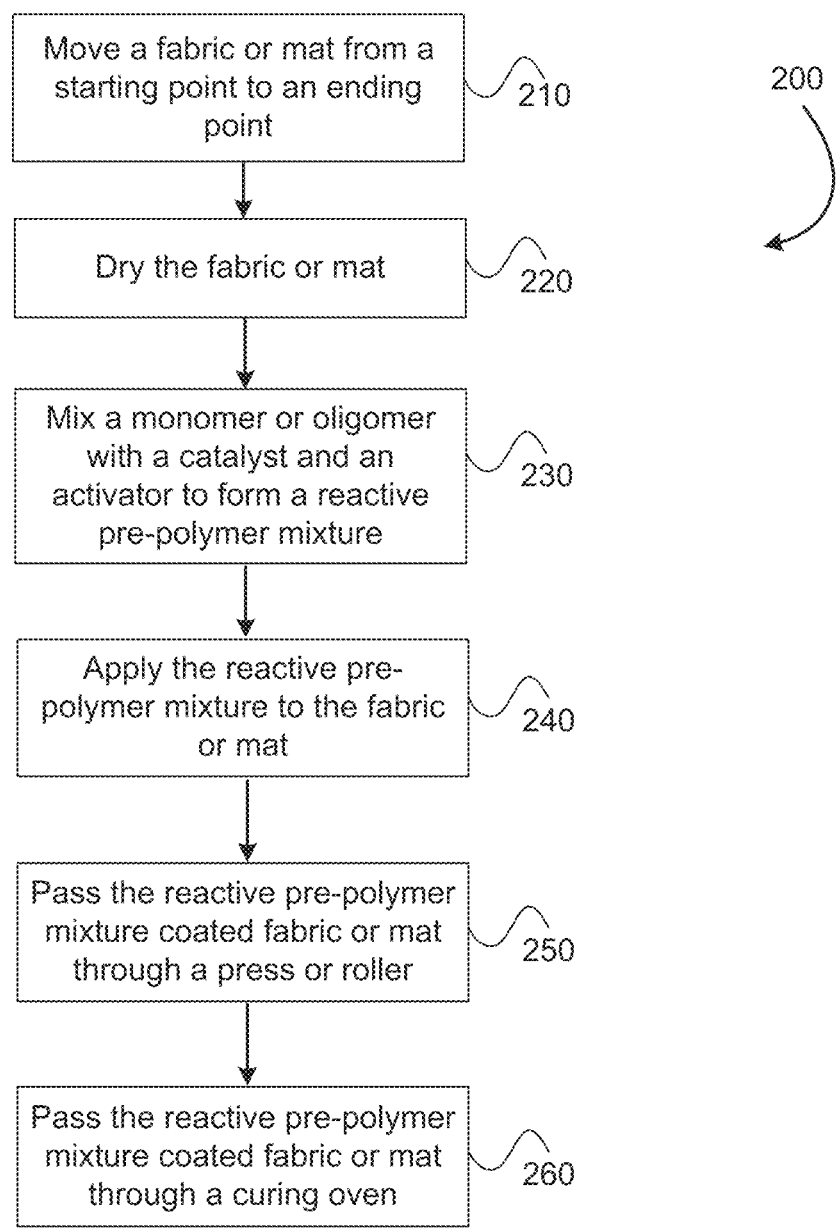
FIG. 2 illustrates a method of forming a fully impregnated thermoplastic prepreg product.

FIG. 2 illustrates a method 200 of forming a fully impregnated thermoplastic prepreg product. At block 210 a fabric or mat is moved from a starting point to an ending point. The fabric or mat is subjected to a plurality of processes between the starting point and ending point and is in substantially constant movement between the starting point and ending point. At block 220, the fabric or mat is dried to remove residual moisture from one or more surfaces of the fabric or mat. At block 230, a monomer or oligomer is mixed with a catalyst and an activator to form a reactive resin mixture. The catalyst and activator facilitate in polymerizing the monomer or oligomer to form a thermoplastic polymer. In some embodiments, a portion of the monomer or oligomer may be mixed with the catalyst in a first tank and a portion of the monomer or oligomer may be mixed with the activator in a second tank that is separate from the first tank. In such embodiments, mixing the monomer or oligomer with the catalyst and the activator comprises mixing the materials from the first tank and the second tank in a static mixer.

At block 240, the reactive resin mixture is applied to the fabric or mat. The reactive resin mixture may have a viscosity of lower than 10 mPa-s. At block 250, the reactive resin mixture coated fabric or mat is passed through a calendar or press that presses the reactive resin mixture through the fabric or mat so that the reactive resin mixture fully saturates the fabric or mat. At block 260, the reactive resin mixture coated fabric or mat is passed or moved through a curing oven to polymerize the reactive resin mixture and thereby form the thermoplastic polymer. During at least a portion of the above process, an environment in the vicinity of the coated fabric or mat is controlled to maintain a humidity in the air to substantially zero. Greater than 90%, 95%, 98%, or even 99% of the reactive resin mixture may be reacted to form the thermoplastic polymer.

In some embodiments, the method may also include applying a moisture-free gas to one or more surfaces of the reactive resin mixture coated fabric or mat to control the environment in the vicinity of the fabric or mat. In a specific embodiment, nitrogen gas may be applied to the one or more surfaces of the reactive resin mixture coated fabric or mat. In some embodiments, the method may further include winding the cured thermoplastic prepreg into a roll product. In some embodiments, the curing oven may be a double belt compression oven. In such embodiments, block 250 and 260 may occur simultaneously.

Figure 3:
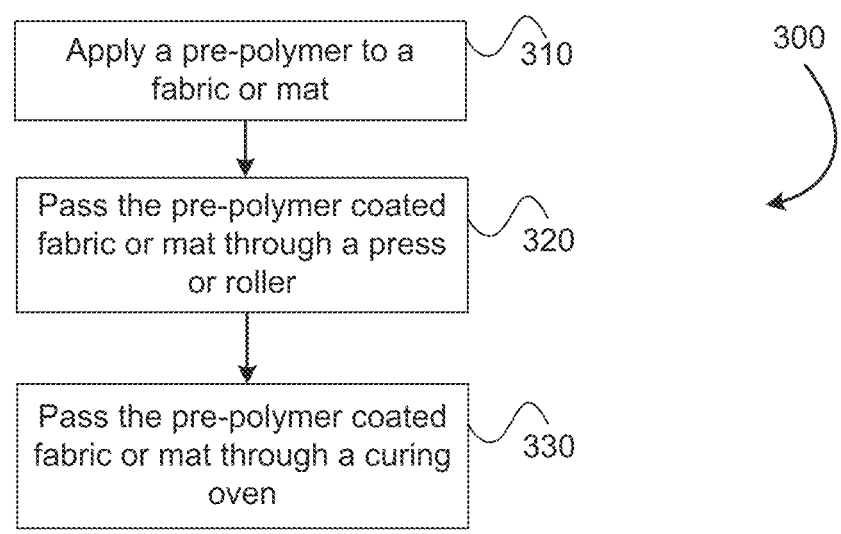
FIG. 3 illustrates another method of forming a fully impregnated thermoplastic prepreg product.

FIG. 3 illustrates another method 300 of forming a fully impregnated thermoplastic prepreg product. At block 310, a reactive resin is applied to a fabric or mat, the resin being combined with a catalyst and an activator that facilitate in polymerizing the resin to form a thermoplastic polymer. The catalyst and activator may be housed in separate holding tanks with or without the resin and may be mixed together with the resin prior to application of the resin to the fabric or mat. Alternatively, the catalyst or the activator may be pre-applied to the fibers of the fabric or mat and the other material may be applied to the fabric or mat with the resin. At block 320, the resin coated fabric or mat is passed or moved through a calendar or press to fully saturate the fabric or mat with the resin. At block 330, the resin coated fabric or mat is passed or moved through a curing oven to polymerize the resin and thereby form the thermoplastic polymer. Stated differently, the resin coated fabric or mat is passed or moved through the oven to polymerize the resin and thereby form the polymer. During at least a portion of the above process, humidity in the vicinity of the coated fabric or mat is maintained at substantially zero. In addition, the above process occurs in a time of 20 minutes or less, 10 minutes or less, or 5 minutes or less.

In some embodiments, the method further includes drying the fabric or mat prior to application of the resin to remove residual moisture from one or more surfaces of the fabric or mat. In such embodiments, an infrared heater, pre-drying oven, or other drying device may be used to remove residual moisture from the fabric or mat.

In some embodiments, the method further includes applying a moisture-free gas to one or more surfaces of the fabric or mat to maintain the humidity in the vicinity of the fabric or mat to substantially zero. In such embodiments, nitrogen gas may be blown across or onto one or more surfaces of the coated fabric or mat. In some embodiments, the method additionally includes winding the fully impregnated thermoplastic prepreg into a roll product. In some other embodiments, the method additionally includes cutting the fully impregnated thermoplastic prepreg into sheets.

Figure 20:
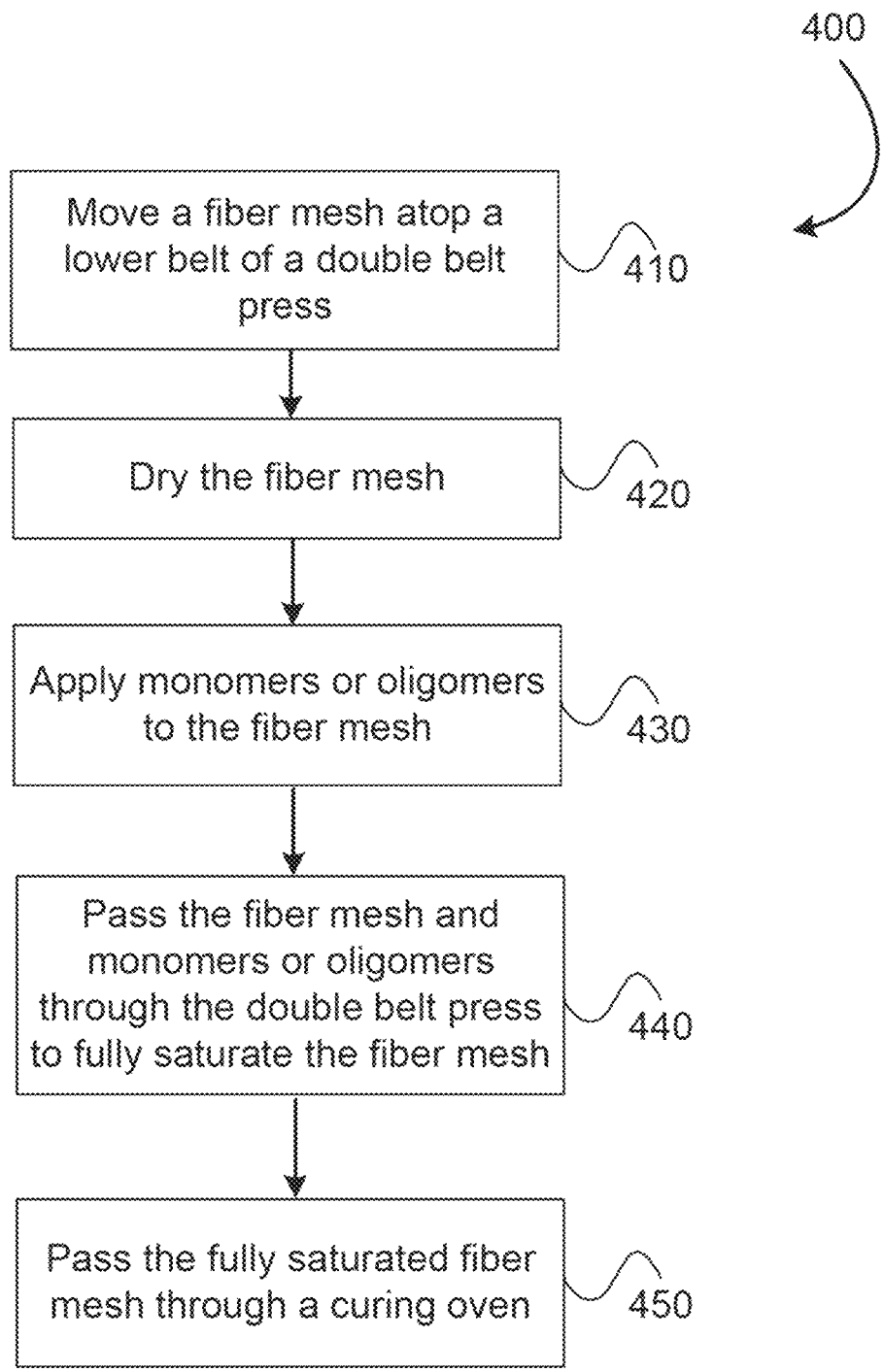
FIG. 20 illustrates another method of forming a fully impregnated thermoplastic prepreg product.

FIG. 20 illustrates a method 400 of forming a thermoplastic prepreg product. At block 410, a fiber mesh is moved atop a lower belt of a double belt press mechanism. The fiber mesh includes chopped fibers. At block 420, the fiber mesh is dried via a drying mechanism that is positioned atop the lower belt and that is configured to remove residual moisture of the fiber mesh. At block 430, monomers or oligomers are applied to the fiber mesh via a resin application die that is positioned atop the lower belt. At block 440, the fiber mesh and the applied monomers or oligomers are passed between the lower belt and an upper belt of the double belt press mechanism to press the monomers or oligomers through the fiber mesh and thereby fully saturate the fiber mesh with the monomers or oligomers. At block 450, the fully saturated fiber mesh is passed through a curing oven that is configured to polymerize the monomers or oligomers as the fiber mesh is moved through the curing oven and thereby form the thermoplastic polymer. The fiber mesh is fully impregnated with the thermoplastic polymer upon polymerization of the monomers or oligomers. The method may also include winding the thermoplastic prepreg into a roll product or cutting the thermoplastic prepreg into sheets.

In some embodiments, the method may also include mixing the monomers or oligomers with a catalyst and an activator to form a reactive resin mixture. The catalyst and activator may facilitate in polymerizing the monomers or oligomers to form the thermoplastic polymer. The method may also include applying a moisture-free gas onto the fiber mesh after the application of the monomers or oligomers to substantially prevent exposure of the monomers or oligomers to ambient moisture in the surrounding environment. The top belt of the double belt mechanism may be fully enclosed within the curing oven.

In some embodiment, the method may also include cutting fiber strands or rovings via a fiber chopper that is positioned above the lower belt to form the chopped fibers. The fiber chopper may be positioned so that as the fibers strands or rovings are cut, the chopped fibers fall atop the lower belt and form the fiber mesh. In such embodiments, the method may further include drying the fiber strands or rovings via a second drying mechanism as the fiber strands or rovings are unwound from one or more spools and before the fiber strands or rovings are cut to form the chopped fibers.

The fiber chopper may be a first fiber chopper and the chopped fibers may be first chopped fibers. In such embodiments, the method may also include cutting second fiber strands or rovings via a second fiber chopper that is positioned above the lower belt to form second chopped fibers. The second fiber chopper may be positioned so that as the second fibers strands or rovings are cut, the second chopped fibers fall atop the first chopped fibers and form a layered or hybrid fiber mesh.

The method may additionally include unwinding a fabric or nonwoven mat from an unwinder and moving the fabric or nonwoven mat atop the lower belt so that the chopped fibers are positioned above or below the fabric or nonwoven mat and form a layered or hybrid fiber mesh that includes or consists of the chopped fibers and the fabric or nonwoven mat. The layered or hybrid fiber mesh may be subjected to the drying mechanism, the resin application die, the double belt mechanism, and the curing oven so that the monomers or oligomers fully saturate the layered or hybrid fiber mesh and the thermoplastic polymer fully impregnates the layered or hybrid fiber mesh upon polymerization of the monomers or oligomers.

In some embodiments, the method may additionally include applying a sizing composition to the fibers of the fiber mesh. The sizing composition may have a coupling agent that promotes bonding between the fibers and the thermoplastic polymer. The fiber mesh may include glass fibers, carbon fibers, basalt fibers, metal fibers, ceramic fiber, natural fibers, synthetic organic fibers, aramid fibers, inorganic fibers, or combinations thereof. The monomers or oligomers may comprise or consist of lactams, lactones, cyclic butylene terephthalate (CBT), methyl methacrylate, precursors of thermoplastic polyurethane, or mixtures thereof. The lactams may comprise or consist of caprolactam, laurolactam, or mixtures thereof.

Figure 21:
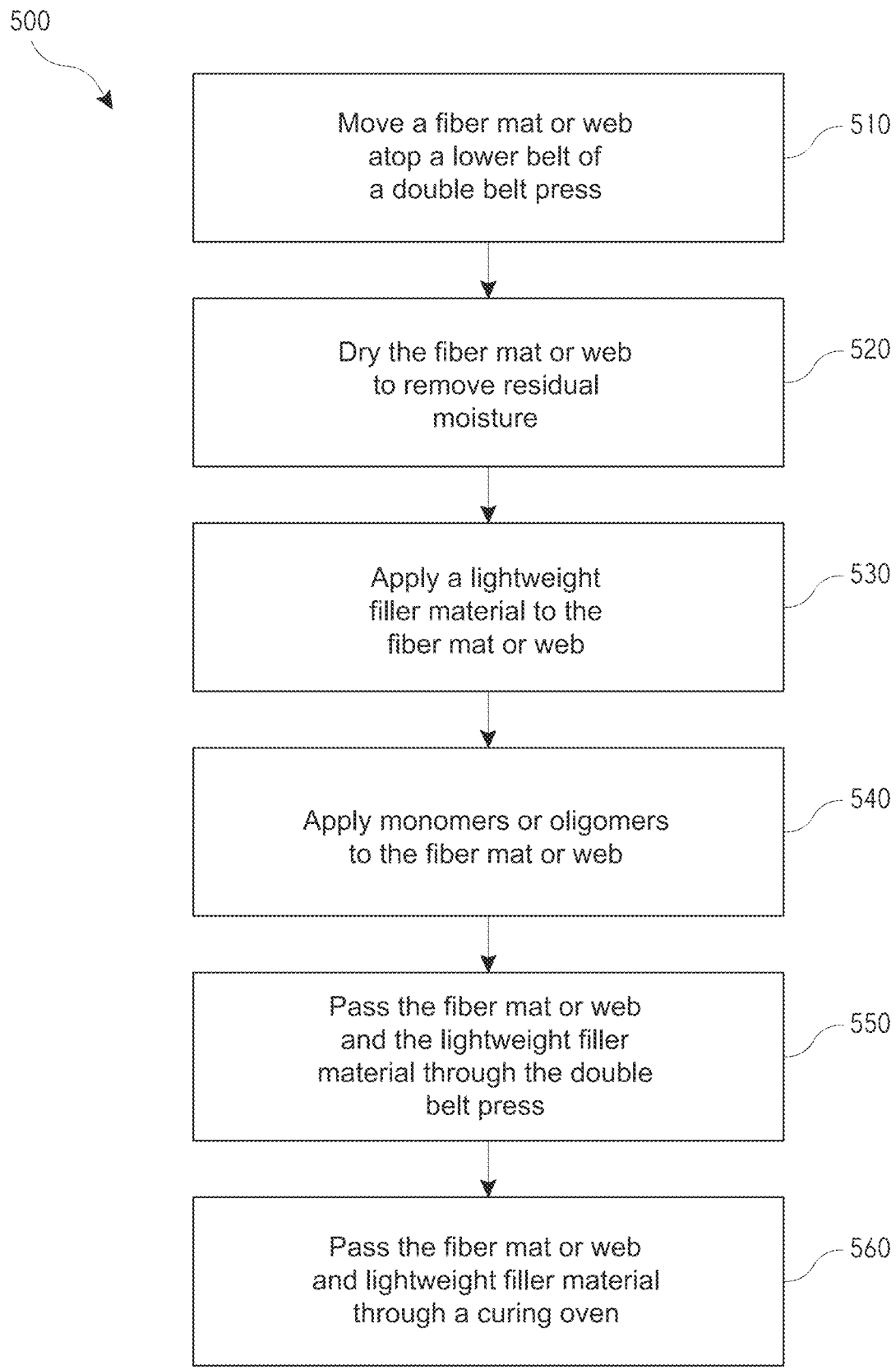
FIG. 21 illustrates a method of forming a lighter weight fully impregnated thermoplastic prepreg.

FIG. 21 illustrate a method 500 of forming a thermoplastic prepreg. At block 510, a fiber mat or web is moved atop a lower belt of a double belt press mechanism. At block 520, the fiber mat or web is dried via a drying mechanism to remove residual moisture from the fiber mat or web. At block 530, a lightweight filler material is applied to the fiber mat or web via an application mechanism that is positioned atop the lower belt. The lightweight filler material is applied as the fiber mat or web is moved past the application mechanism. It should be noted that in some embodiments blocks 520 and 530 may be switched so that the lightweight filler material is applied to the fiber mat or web and then the fiber mat or web and lightweight filler material is dried via the drying mechanism. At block 540, monomers or oligomers are applied to the fiber mat or web via a resin application die that is positioned atop the lower belt. At block 550, the fiber mat or web, the lightweight filler material, and the applied monomers or oligomers are passed between the lower belt and an upper belt of the double belt press mechanism to press the monomers or oligomers through the fiber mat or web and the lightweight filler material and thereby fully saturate the fiber mat or web and lightweight filler material with the monomers or oligomers. At block 560, the fully saturated fiber mat or web and lightweight filler material is passed through a curing oven to polymerize the monomers or oligomers and thereby form a thermoplastic polymer. The monomers or oligomers are polymerized as the fiber mat or web and lightweight filler material are continuously moved through the curing oven. Upon polymerization of the monomers or oligomers, the fiber mat or web and lightweight filler material are fully impregnated with the thermoplastic polymer. The lightweight filler material may be applied to the fiber mat or web so that the lightweight filler material is disposed only on a first side of the fiber mat or web.

In some embodiments, the method may further include cutting the thermoplastic prepreg into separate sheets or pieces, which may be stacked atop one another. In other embodiment, the thermoplastic prepreg may be wound or rolled into a roll product. In some embodiments, the method also includes mixing the monomers or oligomers with a catalyst and/or an activator to form a reactive resin mixture. The catalyst and activator facilitate in polymerizing the monomers or oligomers to form the thermoplastic polymer. The method may further include applying a moisture-free gas onto one or more surfaces of the fiber mat or web after application of the monomers or oligomers to substantially prevent exposure of the monomers or oligomers to ambient moisture in the surrounding environment.

In some embodiments, the fiber mat or web may include a woven fabric, a nonwoven mat, a chopped fiber mesh, or any combination thereof. For example, the fiber mat or web may include a chopped fiber mesh that is formed by disposing chopped fiber strands on the lower belt of the double belt press mechanism. In such embodiments, the method may also include cutting fiber strands or bundles via a fiber chopper that is positioned above the lower belt, or dispersing chopped fibers onto the lower belt via a fiber scattering unit to form a chopped fiber mesh. The fiber chopper may be positioned so that as the fibers strands or bundles are cut, the chopped fibers fall atop the lower belt, or atop a fiber mat or web, to form the chopped fiber mesh. In other embodiments, chopped fibers may be dispersed or spread atop the lower belt, or the fiber mat or web, to form the chopped fiber mesh.

In some embodiments, the application mechanism that applies the lightweight filler material (e.g., hollow glass microspheres) atop the fiber mat or web is a powder applicator or device that is configured to apply the lightweight filler material to the fiber mat or web. In other embodiments, the resin application die is the application mechanism that applies the lightweight filler material atop the fiber mat or web. In such embodiments, the light weight filler material is hollow glass microspheres and the method further includes simultaneously applying the hollow glass microspheres and the monomers or oligomers to the fiber mat or web via the resin application die. The lightweight filler material, and/or the fibers of the fiber mat or web, may include a sizing composition having a coupling agent that promotes bonding between the lightweight filler material or the fibers and the thermoplastic polymer.

In some embodiments, the method may also include applying a second fiber mat or web layer atop the lightweight filler material to form a layered thermoplastic prepreg with multiple layers of the fiber mat or web that are separated by a layer of the lightweight filler material. In such embodiments, the method may further include applying the lightweight filler material atop the second fiber mat or web layer to form an additional layer of the lightweight filler material atop the second mat or web layer. The fiber mat or web may include glass fibers, carbon fibers, basalt fibers, metal fibers, ceramic fiber, natural fibers, synthetic organic fibers, aramid fibers, inorganic fibers, or combinations thereof. The monomers or oligomers may include lactams, lactones, cyclic butylene terephthalate (CBT), MMA, precursors of thermoplastic polyurethane, or mixtures thereof. The lactams may include caprolactam, laurolactam, or mixtures thereof. In some embodiments, the double belt press mechanism and the curing oven may be components of a double belt oven.

EXEMPLARY MATERIALS AND SYSTEMS

Uni-directional stitched fabric consisting of 1200 tex glass fiber rovings with the area weight of 670 g/m$^2$ were used for making polyamide-6 prepregs, using the system shown in FIG. 1A. Two heated tanks were used for melting caprolactam-catalyst and caprolactam-activator separately. 1,000 grams of caprolactam (Brüggemann, AP Nylon grade) and 74.0 grams of Bruggolen® C10 catalyst (containing sodium caprolactamate) were added to the first tank. The mixture of caprolactam and C10 was melted at 100° C. Separately, 1,000 grams of caprolactam (Brüggemann, AP Nylon grade) and 27.0 grams of Bruggolen® C20 activator (containing N,N'-hexane-1,6-diylbis(hexahydro-2-oxo-1H-azepine-1-carboxamide)) were added to the second tank. The mixture of caprolactam and C20 was melted at 100° C. The melts from the two tanks were then mixed at 1:1 ratio in a static mixer before the application of the reactive resin mixture on the fabric through a slot die with the opening of 0.33 mm.

A double belt press oven with two Teflon-coated belts was used in the experiments to press and cure the reactive resin mixture. The double belt press was electrically heated and the oven temperature was set at 390° F. The line speed was set such that the residence time of the coated fabric in the oven was approximately 3.5 minutes. The resin application rate was adjusted to achieve a target resin content of 30% in the prepregs.

Example 1

The experiment was run without infrared (IR) heating as shown in FIG. 1A. The residual moisture on the fabric negatively impacted the anionic polymerization of caprolactam. A significant amount of caprolactam fume was observed at the exit of the double belt press oven; and sticking of the coated fabric to the belts was observed. The caprolactam fume at the oven exit indicates an incomplete polymerization of caprolactam.

Example 2

The experiment was run with IR heating and the fabric was heated to the temperature of 330° F. prior to the application of the reactive resin mixture. The slot die was placed about 10 inches away from the inlet of the oven. No nitrogen purging or box enclosure was used to prevent the exposure of the coated fabric to ambient moisture. A significant amount of caprolactam fume was observed at the exit of the double belt press oven; and sticking of the coated fabric to the belts was observed. The caprolactam fume at the oven exit indicates an incomplete polymerization of caprolactam.

Example 3

Figure 4:
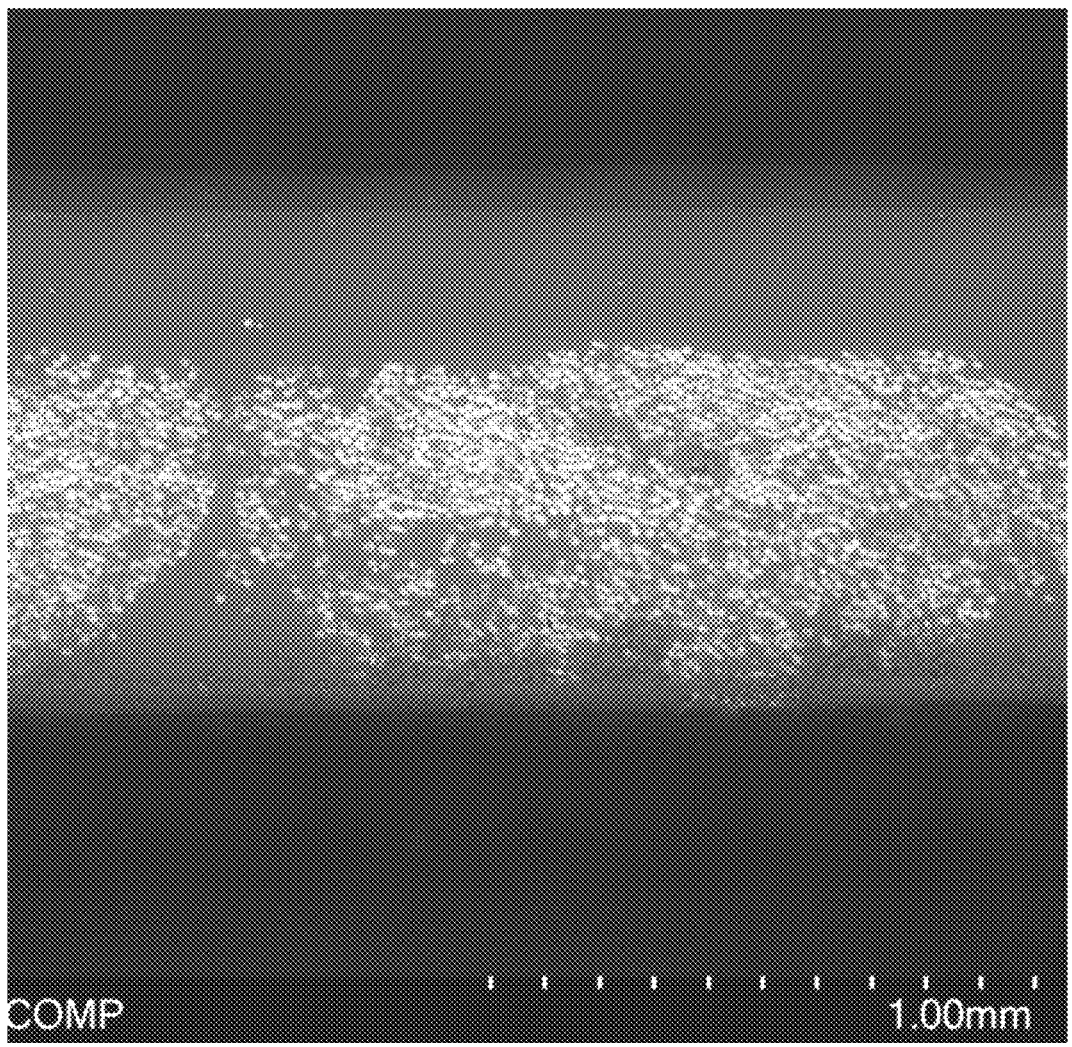
FIG. 4 illustrates a SEM micrograph of a cross-section of a fully impregnated polyamide-6 prepreg.

The experiment was run with IR heating and the fabric was heated to the temperature of 330° F. prior to the application of the reactive resin mixture. The slot die was placed within 1.0 inch from the inlet of the oven. Nitrogen was blown onto the coated fabric through perforated holes on a stainless steel tube, to prevent the exposure of the coated fabric to ambient moisture. Complete polymerization was achieved and minimal amount of caprolactam fume was observed at the exit of the double belt press oven. No sticking of the coated fabric to the belts was observed. Scanning electron microscopy (SEM) analysis was conducted on the resulting prepregs to examine the impregnation. FIG. 4 is a typical SEM micrograph of the cross-section of the prepreg, which indicates the complete impregnation of the fabric with thermoplastic polyamide-6 resin.

As a person of skill in the art would readily understand, the residual monomer or oligomer content in the thermoplastic prepreg can be measured via a solvent extraction method. For example, to measure the amount of residual monomer in polyamide-6 prepregs, powder samples may be prepared by cryo-grinding small pieces of prepregs in a grinder in the presence of liquid nitrogen. Powder samples may then be extracted with water at 150° C. using an Accelerated Solvent Extractor (ASE). The water in the extraction vials may then be evaporated in a turbo evaporator at 65° C. under a stream of nitrogen. The residues may be dried in a vacuum oven at 55° C.; and then weighed to determine the amount of extracted monomer. The conversion rate may be calculated based on the amount of the extracted residual monomer and the starting amount of monomer that is used for the impregnation.

"ASTM" refers to American Society for Testing and Materials and is used to identify a test method by number. The year of the test method is either identified by suffix following the test number or is the most recent test method prior to the priority date of this document. For any other test method or measurement standard defined or described herein, the relevant test method or measurement standard is the most recent test method or measurement standard prior to the priority date of this document. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A system for manufacturing a thermoplastic prepreg, the system comprising:
   a double belt mechanism that includes an upper belt and a lower belt, the upper belt being positioned atop the lower belt to compress a fiber mat or web that is passed through the double belt mechanism and the lower belt having a longitudinal length that is substantially longer than the upper belt;
   a resin applicator that is positioned atop the lower belt and that is configured to apply monomers or oligomers to the fiber mat or web as the fiber mat or web is moved past the resin applicator, wherein the monomers or oligomers are polymerizable to form a thermoplastic polymer;
   an application mechanism that is positioned atop the lower belt and that is configured to apply a light weight filler material to the fiber mat or web as the fiber mat or web is moved past the application mechanism; and
   a curing oven that is configured to effect polymerization of the monomers or oligomers and thereby form the thermoplastic polymer as the fiber mat or web is moved through the curing oven;
   wherein:
      the fiber mat or web includes chopped fibers; and
      the double belt mechanism compresses the fiber mat or web and the applied monomers or oligomers as these materials are passed through the curing oven such that the monomers or oligomers fully saturate the fiber mat or web and thereby effect a full impregnation of the fiber mat or web with the thermoplastic polymer upon polymerization of the monomers or oligomers.

2. The system of claim 1, wherein the lightweight filler material consists of hollow glass microspheres.

3. The system of claim 1, wherein the lightweight filler material is disposed on a first side of the fiber mat or web.

4. The system of claim 1, wherein the application mechanism is a powder applicator or device that is configured to apply the light weight filler material to the fiber mat or web.

5. The system of claim 4, wherein the system further comprises a drying mechanism that is configured to remove residual moisture from the fiber mat or web as the fiber mat or web is moved past the drying mechanism, and wherein the lightweight filler material is dried in a separate drying mechanism prior to being applied via the application mechanism.

6. The system of claim 1, further comprising a cooling mechanism that is configured to cool the thermoplastic prepreg after polymerization of the monomers or oligomers.

7. The system of claim 1, wherein the fiber mat or web consists of a chopped fiber mesh that is formed by disposing chopped fiber strands or rovings on the lower belt of the double belt mechanism.

8. The system of claim 7, further comprising a fiber chopper or fiber scattering unit positioned above the lower belt, the fiber chopper or fiber scattering unit being configured to disperse chopped fiber strands or rovings to form the chopped fiber mesh, wherein the fiber chopper or fiber scattering unit is positioned so that as the chopped fiber strands or rovings are dispersed, the chopped fiber strands or rovings fall atop the lower belt and form the chopped fiber mesh.

9. The system of claim 7, wherein prior to application of the monomers or oligomers, the chopped fiber mesh does not include a binder that bonds or adheres the chopped fibers in the chopped fiber mesh together.

10. The system of claim 7, wherein the chopped fiber strands or rovings comprises multiple fiber types or fiber sizes, and wherein the chopped fiber strands or rovings fall atop the lower belt so that the multiple fiber types or fiber sizes homogenously mix to form a hybrid fiber mesh.

11. The system of claim 1, further comprising a roller around which a fabric or nonwoven mat roll is positioned, wherein the system is configured to unwind the fabric or nonwoven mat from the roller atop the lower belt so that the chopped fibers are positioned above or below the fabric or nonwoven mat and form a layered or hybrid fiber mesh comprising the chopped fibers and the fabric or nonwoven mat, wherein the layered or hybrid fiber mesh is subjected to the resin applicator and the curing oven such that the monomers or oligomers fully saturate the layered or hybrid fiber mesh and the thermoplastic polymer fully impregnates the layered or hybrid fiber mesh upon polymerization of the monomers or oligomers.

12. The system of claim 1, further comprising a mixing component that mixes the monomers or oligomers with at least one of a catalyst and an activator, wherein the catalyst and activator facilitate in polymerizing the monomers or oligomers to form the thermoplastic polymer.

13. The system of claim 1, further comprising a cutting mechanism that cuts the thermoplastic prepreg into sheets, the cutting mechanism being positioned after the curing oven.

14. The system of claim 1, wherein the system further comprises a first fiber chopper that is configured to cut first fiber strands or rovings to form a first chopped fiber mesh atop the lower belt, and wherein the system comprises a second fiber chopper that is configured to cut second fiber strands or rovings to form a second chopped fiber mesh atop the first chopped fiber mesh and thereby form a layered or hybrid fiber mesh.

15. The system of claim 1, wherein the lightweight filler material or the fibers of the fiber mat or web include a sizing composition having a coupling agent that promotes bonding between the lightweight filler material or the fibers and the thermoplastic polymer.

16. The system of claim 1, wherein the fiber mat or web includes glass fibers, carbon fibers, basalt fibers, metal fibers, ceramic fibers, natural fibers, synthetic organic fibers, aramid fibers, inorganic fibers, or combinations thereof.

17. The system of claim 1, wherein the monomers or oligomers comprises lactams, lactones, cyclic butylene terephthalate (CBT), MMA, precursors of thermoplastic polyurethane, or mixtures thereof.

18. The system of claim 17, wherein the lactams comprise caprolactam, laurolactam, or mixtures thereof.

19. The system of claim 1, wherein the thermoplastic polymer consists of thermoplastic polyurethane (TPU).

20. A system for manufacturing a thermoplastic prepreg, the system comprising:
a double belt mechanism that includes an upper belt and a lower belt, the upper belt being positioned atop the lower belt to compress a fiber mat or web that is passed through the double belt mechanism and the lower belt having a longitudinal length that is substantially longer than the upper belt;
a resin applicator that is positioned atop the lower belt and that is configured to apply monomers or oligomers to the fiber mat or web as the fiber mat or web is moved past the resin applicator, wherein the monomers or oligomers are polymerizable to form a thermoplastic polymer; and
a curing oven that is configured to effect polymerization of the monomers or oligomers and thereby form the thermoplastic polymer as the fiber mat or web is moved through the curing oven;
wherein:
the fiber mat or web includes chopped fibers;
the resin applicator is further configured to apply a lightweight filler material atop the fiber mat or web;
the lightweight filler material is hollow glass microspheres;
the hollow glass microspheres are added to the monomers or oligomers such that the hollow glass microspheres are applied to the fiber mat or web simultaneously with the monomers or oligomers; and
the double belt mechanism compresses the fiber mat or web and the applied monomers or oligomers as these materials are passed through the curing oven such that the monomers or oligomers fully saturate the fiber mat or web and thereby effect a full impregnation of the fiber mat or web with the thermoplastic polymer upon polymerization of the monomers or oligomers.

* * * * *